United States Patent [19]

Fujimoto et al.

[11] Patent Number: 5,179,476
[45] Date of Patent: Jan. 12, 1993

[54] SIGNAL PROCESSOR

[75] Inventors: Ryo Fujimoto; Toshihiko Mimura, both of Kanagawa, Japan

[73] Assignee: Canon Kabushiki Kaisha, Tokyo, Japan

[21] Appl. No.: 762,786

[22] Filed: Sep. 19, 1991

Related U.S. Application Data

[63] Continuation of Ser. No. 643,155, Jan. 18, 1991, which is a continuation of Ser. No. 243,985, Sep. 13, 1988.

[30] Foreign Application Priority Data

Sep. 16, 1987 [JP] Japan .................. 62-233166
Sep. 16, 1987 [JP] Japan .................. 62-233171
Sep. 16, 1987 [JP] Japan .................. 62-233173

[51] Int. Cl.⁵ .................................. G11B 20/06
[52] U.S. Cl. .................................. 360/30; 360/33.1
[58] Field of Search .................................. 360/30

[56] References Cited

U.S. PATENT DOCUMENTS 4,200,889  4/1980  Strobele .................. 360/65
4,849,826  7/1989  Ohrz ..................... 260/65

Primary Examiner—Vincent P. Canney
Attorney, Agent, or Firm—Robin, Blecker, Daley & Driscoll

[57] ABSTRACT

A signal processor is arranged such that, after an input signal is converted in such a manner that a first high-frequency component is relatively attenuated more than a low-frequency component by a predetermined amount as compared with a state before the input of the signal, a second high-frequency component which is different from the first high-frequency component is amplified, thereby reducing a noise component without exerting an adverse effect on the signal.

18 Claims, 20 Drawing Sheets a    b    c a    b    c a    b    c a  b  c a  b  c a  b  c

SIGNAL PROCESSOR

This is a continuation application under 37 CFR 1.62 of prior application Ser. No. 643,155, filed Jan. 18, 1991, which is a continuation application under 37 CFR 1.62 of prior application Ser. No. 243,985, filed Sept. 13, 1988.

BACKGROUND OF THE INVENTION

1. Field of the Invention

The present invention relates to a signal processor and, more particularly, to a signal processor which amplifies a fixed frequency component of a signal when the signal is transmitted.

2. Description of the Related Art

Conventionally, a recording and reproducing apparatus is known as an apparatus for transmitting signals.

In a known magnetic recording and reproducing apparatus, a method of emphasis is adopted for the purpose of attenuating a noise component occurring in the signal.

This emphasis is a method whereby, when, for instance, a video signal is subjected to frequency modulation to effect magnetic recording, if only the deviation of the frequency modulation is expanded to reduce the noise component, an adverse effect such as moiré caused by the signal of the sideband results, so that only the deviation of a high-frequency component of the input video signal is expanded to effect recording, thereby reducing the effect of the noise component during recording.

It is generally known that, by virtue of this emphasis, the spectrum of the noise component after frequency demodulation and demodulation shown in FIG. 1(a) is, after demodulation, converted into a spectrum such as the one shown in FIG. 1(b), thereby reducing the noise component.

In addition, methods called fixed emphasis and dynamic emphasis are known as methods of the above-described emphasis. A description will be given hereafter of these methods by using a video signal frequency modulation magnetic recording apparatus to which these methods are applied.

FIG. 2 shows a schematic diagram of a magnetic recording apparatus in which fixed emphasis is employed. In FIG. 2, the magnetic recording apparatus comprises a fixed emphasis circuit 200, a limiter circuit 201, a frequency modulation circuit 202, a recording amplifier 203, a magnetic head 204, and a magnetic sheet 205 constituting a magnetic recording medium. The fixed emphasis circuit 200 normally has amplification characteristics, as shown in FIG. 3(a), and is configured by a very simple circuit, as shown in FIG. 3(b). Since the configuration shown in FIG. 3(b) is generally known, a description thereof will be omitted.

In FIG. 2, the high-frequency component of an input video signal is amplified by the fixed emphasis circuit 200 on the basis of the amplification characteristics shown in FIG. 3(a). As a result, at the sharp rising and falling of the video signal, sharp spikes called white peak and dark peak are produced, as shown in FIG. 2, and these spikes cause the known inverted white peak and the like. Therefore, after the level at the portion of the spikes is shaped by the limiter 201, the video signal is subjected to frequency modulation by the frequency modulation circuit 202. At this time, with respect to the frequency-modulated signal output by the frequency modulation circuit 202, since the signal whose high-frequency component has been amplified by the fixed emphasis circuit 200 is subjected to frequency modulation, the deviation in the high-frequency component is modulated more than that of the low-frequency component.

Subsequently, the signal modulated as described above is amplified by the recording amplifier 203, and is then recorded by the magnetic head 204 on the magnetic sheet 205 which is being rotated by a motor (not shown).

In addition, FIG. 4 shows a schematic diagram of a magnetic recording apparatus in which dynamic emphasis is employed. In FIG. 4, the magnetic recording apparatus comprises a dynamic emphasis circuit 400, a limiter circuit 401, a frequency modulation circuit 402, a recording amplifier 403, a magnetic head 404, and a magnetic sheet 405 constituting a magnetic recording medium. The dynamic emphasis circuit 400 has characteristics in which the amplification factor changes non-linearly in response to the level of the input signal, and it is possible to obtain a greater effect of noise reduction as compared with the apparatus using the aforementioned fixed emphasis circuit 200. In addition, FIG. 5(a) shows the amplification characteristics of the dynamic emphasis circuit 400, while FIG. 5(b) shows a specific example of its configuration. Since the configuration shown in FIG. 5(b) is generally known, a description thereof will be omitted.

In FIG. 4, the high-frequency component of the input video signal is amplified by the dynamic emphasis circuit 400 on the basis of the amplification characteristics shown in FIG. 5(a). At the rising and falling of the video signal, the white peak and the dark peak occur as in the case of the afforementioend fixed emphasis circuit 200. However, the lower the level, the video signal is amplified with the higher amplification factor, so that appropriate amplification is effected in correspondence with the level of the input video signal.

After it is subjected to dynamic emphasis and its portions of the white peak and the dark peak are shaped by the limiter circuit 401, the video signal is subjected to frequency modulation by the frequency modulation circuit 402, goes through the recording amplifier 403, and is recorded on the magnetic sheet 405 being rotated by a motor (not shown) by means of the magnetic head 404.

Thus, the noise component of the high-frequency component of the recorded signal is reduced, as shown in FIG. 1(b), by a recording apparatus having the above-described emphasis circuit, while the recorded signal can be reproduced easily by a reproducing apparatus such as the one shown in FIG. 6.

In FIG. 6, the reproducing apparatus comprises a magnetic sheet 600 constituting a magnetic recording medium, a magnetic head 601, a pre-amplifier 602, a frequency demodulation circuit 603, and a de-emphasis circuit 604. After the signal reproduced from the magnetic sheet 600 by the magnetic head 601 is amplified by the pre-amplifier 602, the signal is demodulated by the frequency demodulation circuit 603 and the video signal is restored and output by the de-emphasis circuit 604 having opposite characteristics to those of the fixed emphasis circuit 200 shown in FIG. 2 or the dynamic emphasis circuit 400 shown in FIG. 4.

When the noise component is reduced by using the above-described emphasis circuit, the greater the amplification factor of the high-frequency component of the signal, the more the deviation in the high-frequency component expands during frequency modulation. As a result, the effect of reduction of the noise component becomes high.

However, if the amplification factor is made excessively high with respect to the high-frequency component, the known inverted white peak occurs during the frequency demodulation on the reproducing side, so that it becomes impossible to restore the signal properly.

The inverted white peak is a phenomenon in which, if a signal having a sharp peak produced by being subjected to an emphasis circuit is frequency-modulated and recorded, a zero cross point at a portion corresponding to the peak of the reproduced signal drops out during reproduction, and, if the recorded signal is a video signal, the signal which essentially represents white is restored as a signal representing black, or vice versa. To prevent the occurrence of this phenomenon, after emphasis is carried out, as described before, a limiter is applied by the limiter circuit by limiting the level of the peak portions to some extent.

Howver, if the above-described limiter is applied excessively, the known phenomenon of smear occurs, resulting in the deterioration of the reproduced signal, so that there is a limit to increasing the amplification factor in the fixed emphasis.

In addition, dynamic emphasis has been such that it is impossible to increase the amplification factor above a certain level since the non-linear characteristics cannot be set severely in consideration of the need to maintain the compatibility of the apparatus.

Particularly recently, there has been a strong demand for high-quality recording and reproduction of the video signal. Hence, the so-called high-band recording in which the video signal is frequency modulated and recorded by using a high-frequency carrier signal. Although it is necessary to increase the amplification factor in emphasis so as to reduce the noise component, conventional methods of emphasis make it difficult to increase the amplification factor, as described above. Hence, it has been impossible to effect a sufficient reduction of the noise component.

SUMMARY OF THE INVENTION

Accordingly, an object of the present invention is to provide a signal processor which is capable of overcoming the above-described drawbacks of the prior art.

Another object of the present invention is to provide a signal processor which is capable of reducing the noise component without exerting an adverse effect on a signal.

To these ends, according to one aspect of the present invention there is provided a signal processor for processing an input signal and outputting the processed signal, comprising: signal waveform converting means for converting the input signal in such a manner that a first high-frequency component is relatively attenuated more than a low-frequency component by a predetermined amount as compared with a state before the input of the signal and for outputting the converted signal; and amplifying means for amplifying a second high-frequency component different from the first high-frequency component with respect to the signal converted by the signal waveform converting means and for outputting the amplified signal.

Still another object of the present invention is to provide a information signal recording apparatus which is capable of recording an information signal on a recording medium by providing optimum noise reduction processing in correspondence with a recording format of the information signal.

To this end, according to another aspect of the present invention there is provided an information signal recording apparatus for effecting recording on a recording medium by subjecting an information signal to frequency modulation by using one of a first carrier frequency signal and a second carrier frequency signal having a frequency higher than that of the first carrier frequency signal, the information signal recording apparatus comprising: signal waveform converting means for converting the input information signal in such a manner that a first high-frequency component is relatively attenuated more than a low-frequency component by a predetermined amount as compared with a state before the input of the signal and for outputting the converted signal; first amplifying means for amplifying a second high-frequency component different from the first high frequency component with respect to the signal whose waveform has been converted by the signal waveform converting means and for outputting the amplified signal; changing-over and outputting mean for outputting one of the signal output by the first amplifying means and the input information signal; second amplifying means for amplifying a predetermined frequency component of the signal output by the changing over and outputting means in accordance with the level of the predetermined frequency component and for outputting the amplified signal; and recording means to which the signal output by the second amplifying means is input, and in which the input signal is subjected to frequency modulation by using the first carrier frequency signal in a case where the input signal is the input information signal amplified as it is by the second amplifying means, and in which the input signal is subjected to frequency modulation by using the second carrier frequency signal in a case where the input signal is the signal output by the first amplifying means and amplified by the second amplifying means, and the frequency-modulated signal is then recorded on a recording medium.

The above and other objects, features and advantages of the present invention will become apparent from the following detailed description of the invention when read in conjunction with the accompanying drawings.

BRIEF DESCRIPTION OF THE DRAWINGS

FIG. 3(a) is a characteristic diagram of the fixed emphasis circuit shown in FIG. 2, while

FIG. 5(a) is a characteristic diagram of the dynamic emphasis circuit shown in FIG. 4, while

FIGS. 7(a), 7(b), 7(c), 7(d), and 7(e) are schematic diagrams of a still video apparatus in accordance with a first embodiment of the present invention, in which FIG. 7(a) is a block diagram of the apparatus;

FIG. 7(b) is a block diagram of a waveform conversion circuit shown in FIG. 7(a);

FIG. 7(c) is a block diagram of a waveform reverse-conversion circuit shown in FIG. 7(a);

FIG. 7(d) is a waveform diagram at respective operating positions in cases where a sine sweep waveform signal is input;

FIG. 7(e) is a waveform diagram at respective operating positions in cases where a luminance signal is input;

FIGS. 12(a), 12(b), 12(c), 12($d_1$), 12($d_2$), 12(e), and 12(f) are schematic diagrams of a still video apparatus in accordance with a third embodiment of the present invention, in which FIG. 12(a) is a block diagram of the apparatus;

FIG. 12(b) is a block diagram of the waveform conversion circuit shown in FIG. 12(a);

FIG. 12(c) is a block diagram of the waveform reverse-conversion circuit shown in FIG. 12(a);

FIGS. 12($d_1$) and 12($d_2$) are waveform diagrams at respective operating positions in cases where a sine sweep waveform signal is input;

FIGS. 13(a), 13(b), 13(c), 13($d_1$), 13($d_2$), 13(e), and 13(f) are schematic diagrams of a still video apparatus in accordance with a fourth embodiment of the present invention, in which FIG. 13(a) is a block diagram of the apparatus;

FIG. 13(b) is a block diagram of the waveform conversion circuit shown in FIG. 13(a);

FIG. 13(c) is a block diagram of the waveform reverse-conversion circuit shown in FIG. 13(a);

FIGS. 13($d_1$) and 13($d_2$) are waveform diagrams at respective operating positions in cases where a sine sweep waveform signal is input;

DETAILED DESCRIPTION OF THE PREFERRED EMBODIMENTS

Referring now to the accompanying drawings, a description will be given of the embodiments of the present invention.

As the embodiments of the present invention, a description will be given of a case in which the present invention is applied to a still video apparatus. To simplify the description, the still video apparatus in these embodiments has a configuration in which only a circuit concerning processing of a luminance signal is provided.

FIGS. 7(a) to 7(e) are schematic diagrams of a still video apparatus in accordance with a first embodiment of the present invention.

First, a description will be given of the operation during recording.

Figure 7A:
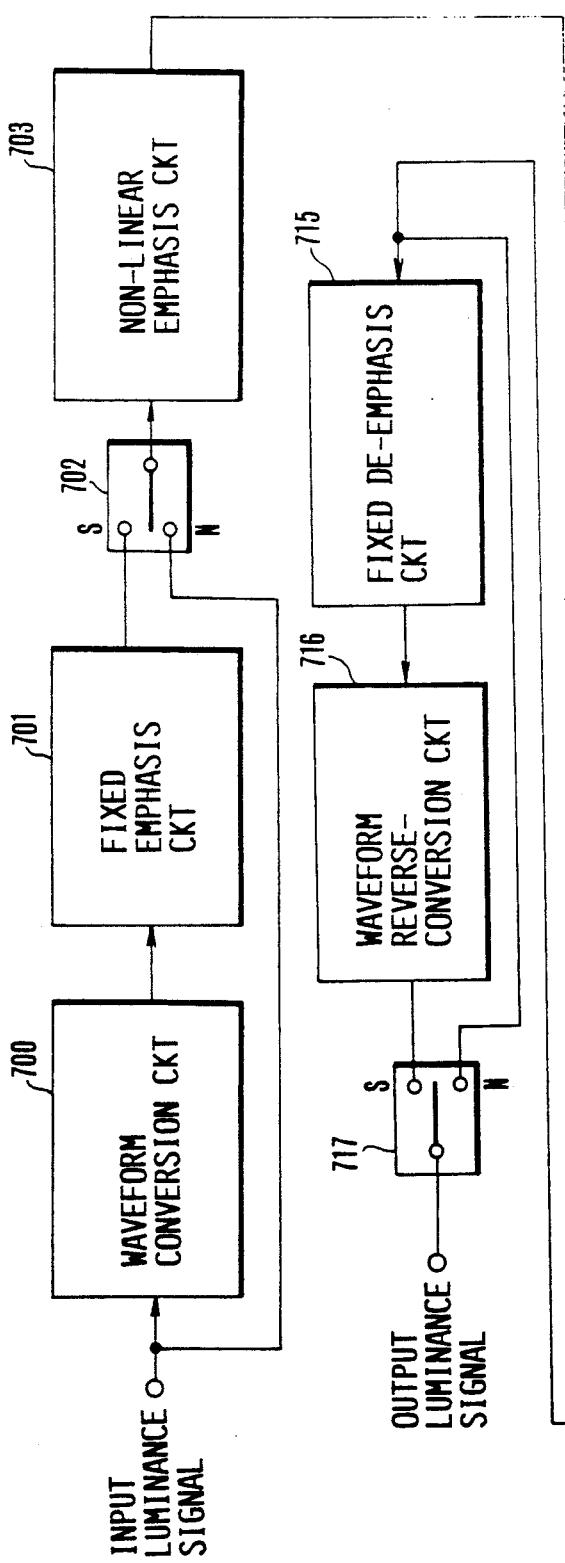
Figure 7A:
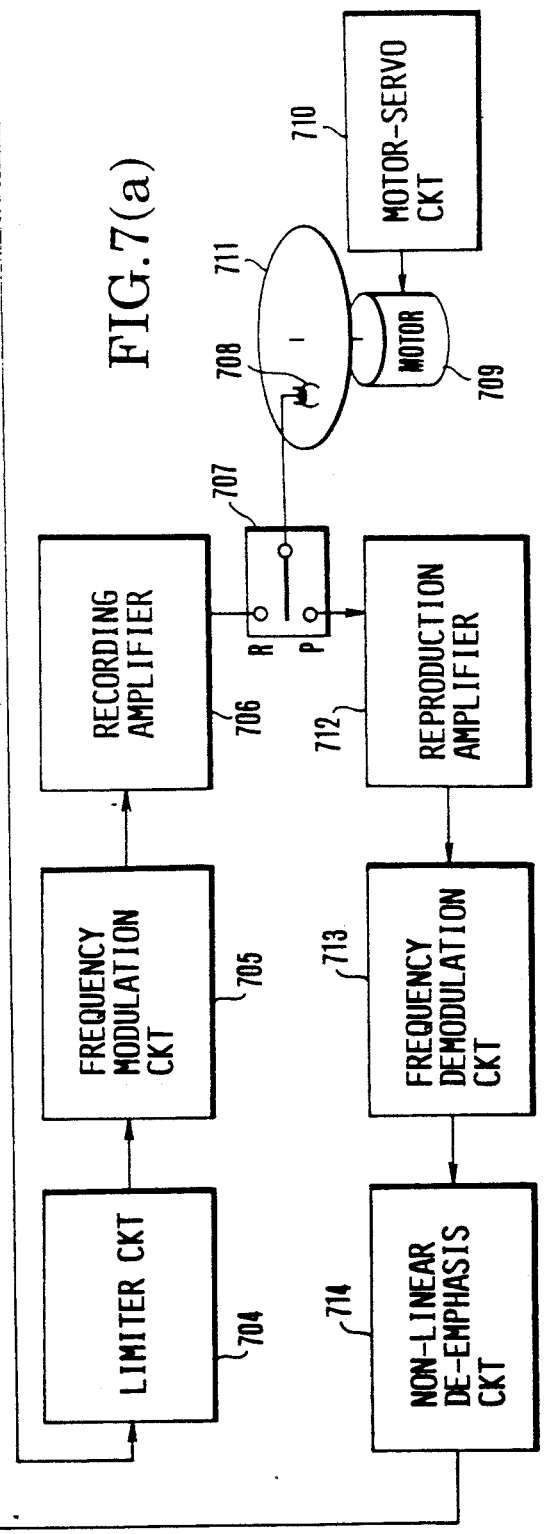
Figure 7B:
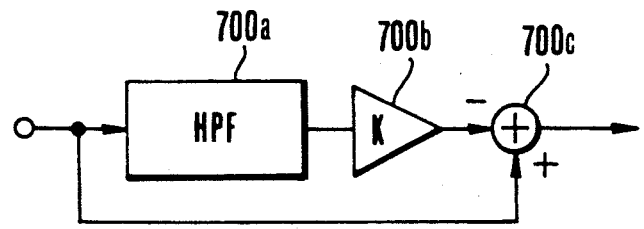

In FIG. 7(a), a waveform conversion circuit 700 is configured by a circuit such as the one shown in FIG. 7(b).

In FIG. 7(b), a high-pass filter (HPF) 700a is adapted to extract a high-frequency component of an input luminance signal. The high-frequency component of the luminance signal extracted here is supplied to a coefficient multiplication circuit 700b, where the high-frequency component is multiplied by a coefficient K (K<1) and is then supplied to a minus (−) terminal of an adder 700c. Meanwhile, an input luminance signal is supplied to a plus (+) terminal of the adder 700c, and a luminance signal whose high-frequency component is suppressed by a predetermined amount is output from the adder 700c.

The high-frequency component of the signal which is output from the waveform conversion circuit 700 is amplified by a fixed emphasis circuit 701. The time constant of each circuit is set in such a manner that the high-frequency component amplified by the fixed emphasis circuit 701 is a high band-side component among the frequency component suppressed by the waveform conversion circuit 700.

Figure 7C:
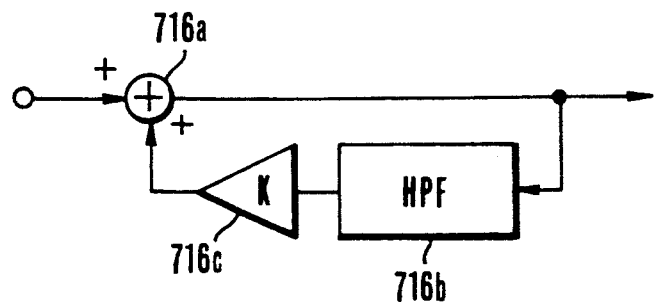
Figure 7D:
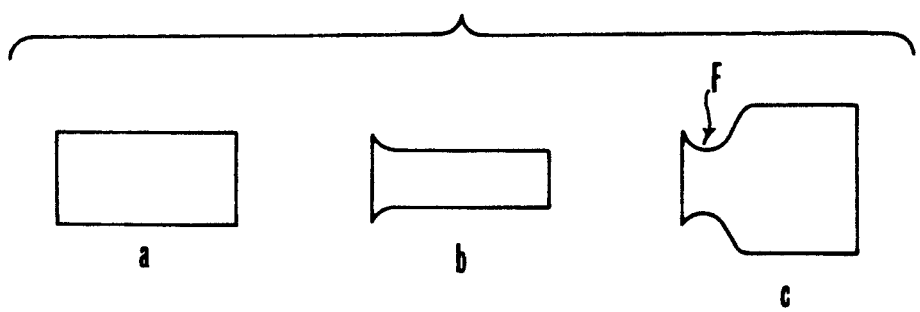
Figure 7E:
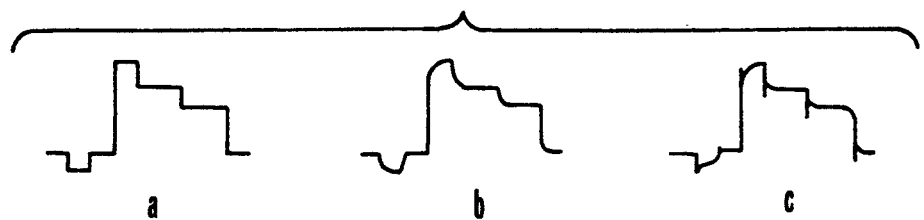

FIGS. 7(d) and 7(e) show how the waveform of the signal changes by the above-described circuits. FIG. 7(d) is a diagram illustrating a change in the waveform in a case where a sine sweep waveform signal a is input. The drawing shows that attenuation takes place in the high-frequency component as in the case of a waveform b by means of the waveform conversion circuit 700, and, furthermore, the high-band component among the attenuated frequency component is amplified as in the case of a waveform c by means of the fixed emphasis circuit 701. In addition, the change in the waveform in a case where the luminance signal a is input is shown in FIG. 7(e). In other words, the high-frequency component is suppressed by the waveform conversion circuit 700. As a result, the waveform is converted into a waveform b in which the rising and falling edges of the signal become blunt, and is further converted into a waveform c as the high-band component among the frequency component suppressed by the fixed emphasis circuit 701 is emphasized.

Figure 1A:
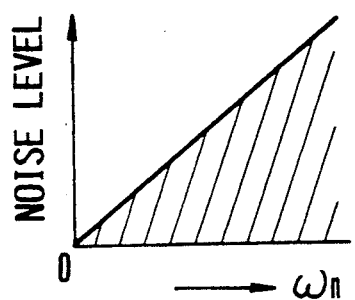
FIGS. 1(a) and 1(b) are graphs illustrating a spectrum of a noise component after frequency modulation and demodulation.
Figure 1B:
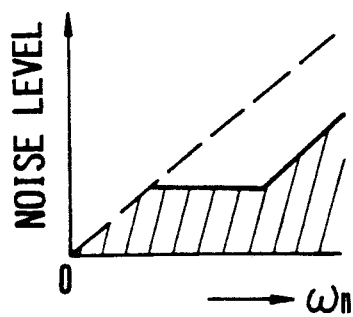
Figure 2:
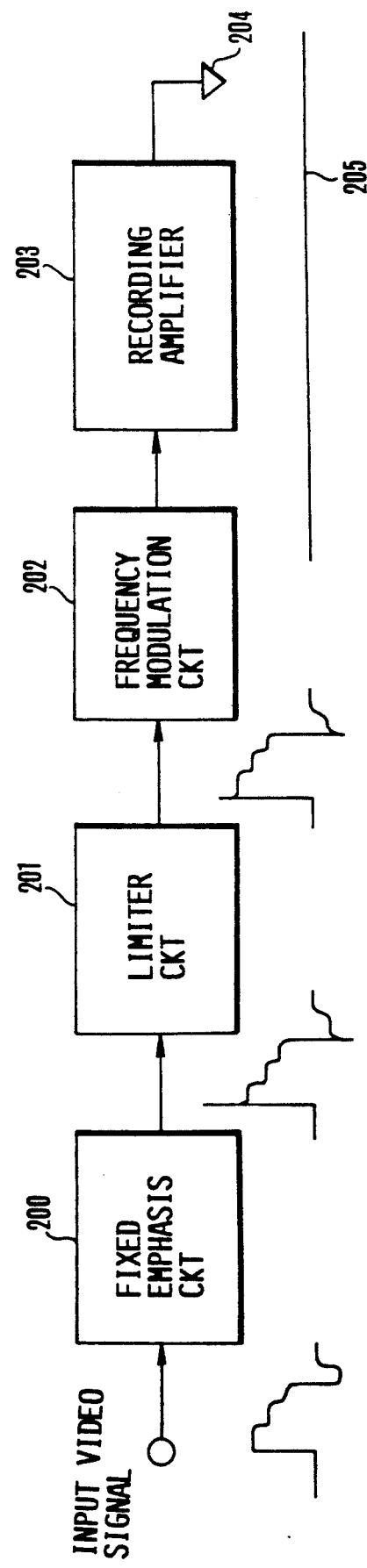
FIG. 2 is schematic diagram of a conventional magnetic recording apparatus using a fixed emphasis circuit.
Figure 3A:
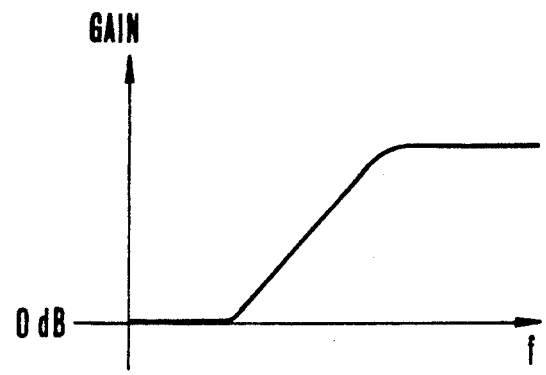
Figure 3B:
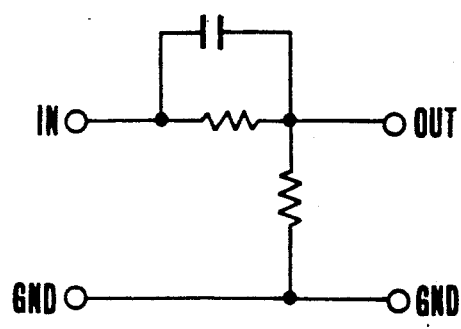
FIG. 3(b) is a circuit diagram thereof.
Figure 4:
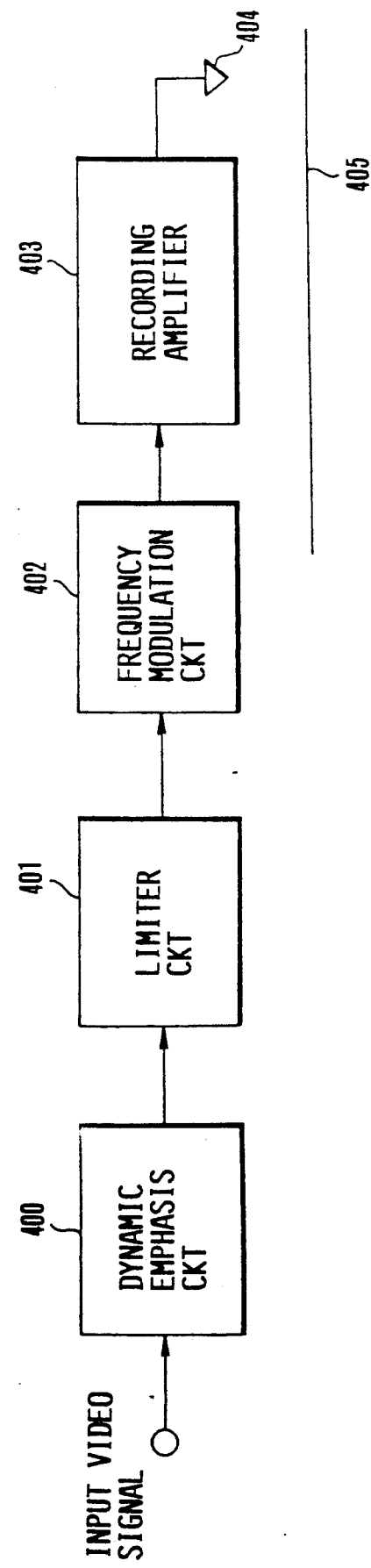
FIG. 4 is a schematic diagram of a conventional magnetic recording apparatus using a dynamic emphasis circuit.
Figure 5A:
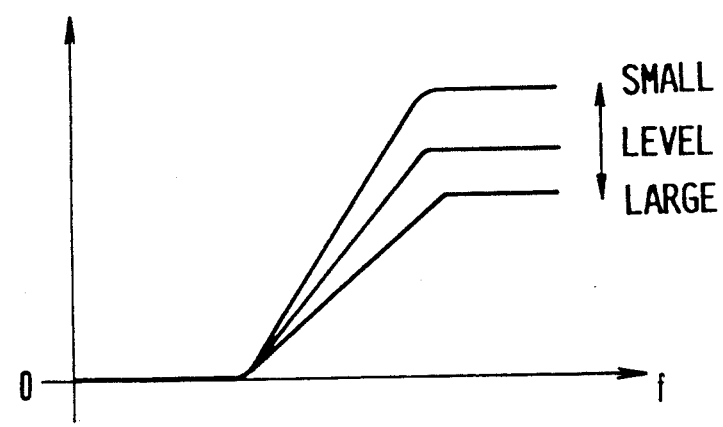
Figure 5B:
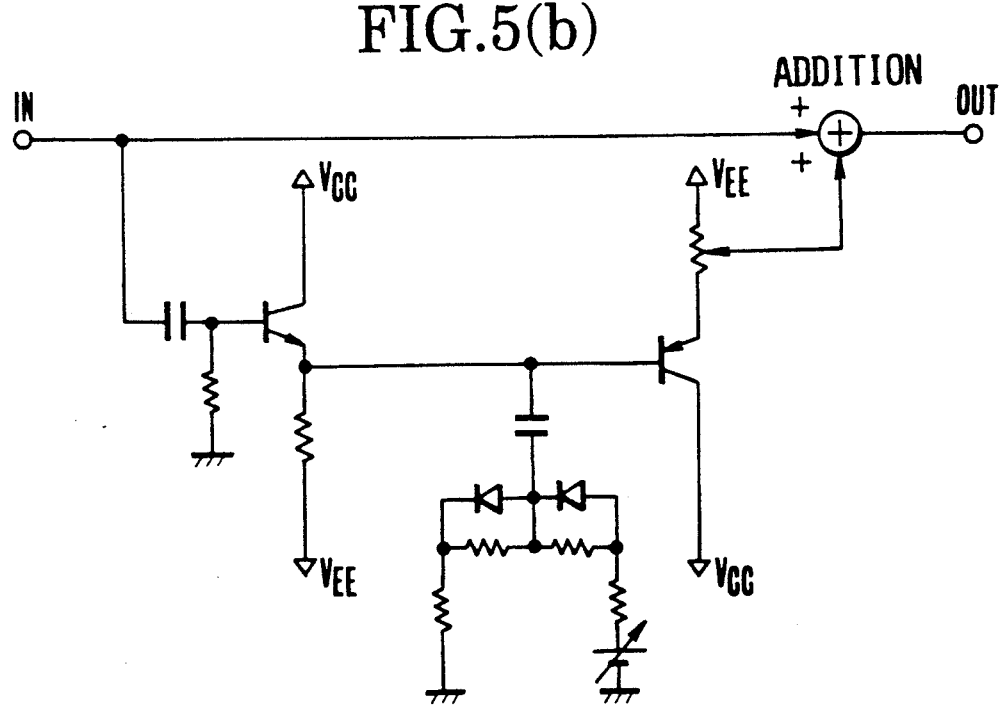
FIG. 5(b) is a circuit diagram thereof.
Figure 6:
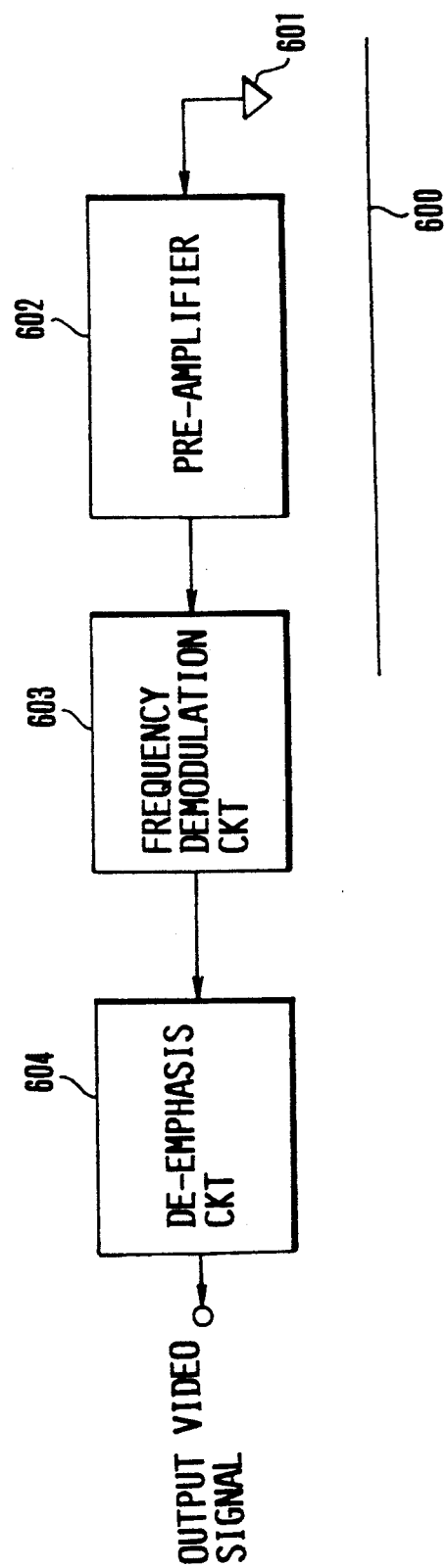
FIG. 6 is a schematic diagram of a conventional magnetic reproducing apparatus.

Thus, it is possible to reduce the noise component, since the high-frequency component corresponding to the rising and falling edge portions of the luminance signal is temporarily suppressed and the high-band component of the suppressed frequency component is emphasized. At the same time, since it is possible to ensure that the width of the spike-like pulse at the edge portion which occurs as a result of emphasis can be made narrower, it is possible to reduce the edge-pulse. In addition, in the above-described circuit, since the frequency component suppressed by the waveform conversion circuit 700, rather than the frequency component amplified by the fixed emphasis circuit 701, is wider in the vicinity of the low-frequency component, a decline in the level occurs in some low-frequency component, as shown in the waveform c in FIG. 7(d) (F in the drawing). However, since the distribution of the noise component which is produced after demodulation in the process of frequency modulation and demodulation becomes a triangular spectrum, as shown in FIG. 1(a), an increase in the noise component in the low-frequency component is of such a measure that it is substantially unnoticeable.

The luminance signal thus processed is supplied to a terminal (S in the drawing) of a changeover switch 702, and is supplied to a non-linear emphasis circuit 703 via the changeover switch 702.

This non-linear emphasis circuit 703, which is equivalent to a conventionally used dynamic emphasis circuit, amplifies the high-frequency component non-linearly in accordance with the level of an input signal. It should be noted that a reduction of the noise component is already effected to a certain extent by the waveform conversion circuit 700 and the fixed emphasis circuit 701 preceding this non-linear emphasis circuit 703. Hence, the noise component can be reduced further by providing the signal with normal emphasis by means of this non-linear emphasis.

The signal thus emphasized by the non-linear emphasis circuit 703 is subjected to suppression of the level of the spike-like pulses at the edge portions by a limiter circuit 704, and is then supplied to a frequency modulation circuit 705.

Subsequently, after being subjected to frequency modulation by the frequency modulation circuit 705, the signal is amplified by a recording amplifier 706, and, at the time of recording, the amplified frequency modulated luminance signal is supplied to a magnetic head 708 via a changeover switch 707 connected to an R side by a system controller (not shown), and is then recorded on a magnetic sheet 711 being rotated at a fixed speed by a motor 709.

The rotation of the motor 709 is controlled in response to an operation instruction signal from the system controller (not shown) by means of a motor servo circuit 710.

Meanwhile, during reproduction, the operation is carried out as follows: The motor 709 is rotated by the motor-servo circuit 710 at a fixed speed in accordance with an instruction from the system controller (not shown), a magnetic sheet 711 is rotated at a fixed speed by the motor 709, and the signal recorded on the magnetic sheet 711 is reproduced by a magnetic head 708. During reproduction, the reproduced signal is supplied to a reproduction amplifier 712 via the changeover switch 707 connected to a P side by the system controller (not shown). After being amplified by the reproduction amplifier 712, the signal is demodulated by a frequency demodulation circuit 713 and is then supplied to a non-linear de-emphasis circuit 714.

The non-linear de-emphasis circuit 714 has opposite characteristics to those of the non-linear emphasis circuit 703 provided in the above-described recording system, and is adapted to suppress to an original level the high-frequency component amplified during recording.

In addition, the signal which is output from the non-linear de-emphasis circuit 714 is supplied to a fixed de-emphasis circuit 715 having opposite characteristics to the fixed emphasis circuit 703 provided in the above-described recording system. The fixed de-emphasis circuit 715 suppresses to an original level the high-frequency component amplified during recording, and then supplies the signal to a waveform reverse-conversion circuit 716.

The waveform reverse-conversion circuit 716 is configured, as shown in FIG. 7(c), and employs a high-pass filter (HPF) 716b and a coefficient multiplication circuit 716c having characteristics completely identical to those of the HPF 700a and the coefficient multiplication circuit 700b of the waveform conversion circuit 700 in the recording system, so as to restore the high-frequency component of the luminance signal suppressed by a predetermined amount during recording. In addition, since an adder 716a is employed to effect positive feedback, as illustrated in the drawing, the reproduced luminance signal is restored. Incidentally, with respect to the coefficient multiplication circuit 716c, since the coefficient K which is multiplied is given by $K<1$, in the same way as the coefficient multiplication circuit 700b, there is no possibility of oscillating at the time when the positive feedback is effected.

The reproduced luminance signal restored and output by the waveform reverse-conversion circuit 716 is supplied to a terminal S of a changeover switch 717, and is output via the changeover switch 717.

The embodiment shown in FIG. 7(a) is provided with the recording system-side changeover switch 702 and the reproducing system-side changeover switch 717. The arrangement is such that, on the recording system side, the input luminance signal is supplied as it is to the terminal N of the changeover switch 702 without passing through the waveform conversion circuit 700 and the fixed emphasis circuit 701, while, on the reproducing system side, the reproduced luminance signal output by the non-linear de-emphasis circuit 714 is supplied as it is to the terminal N of the changeover switch 717 without passing through the the fixed de-emphasis circuit 715 and the waveform reverse-conversion circuit 716.

The changeover operation of these changeover switches 702 and 717 is controlled by the system controller (not shown). The apparatus shown in this embodiment is provided with a high-quality recording mode for effecting recording by making use of the high band so as to record the luminance signal with higher quality than in the case of a conventional apparatus and with a normal recording mode for effecting recording in a conventional manner. When the high-quality recording mode is designated by the system controller during recording, a more severe reduction of the noise component than in the case of a conventional apparatus becomes necessary, so that the changeover switch 702 is connected to the terminal S in the drawing, the signal which has been subjected to processing for noise component reduction is selected by using the waveform conversion circuit 700 and the fixed emphasis circuit 701, as described before, and this signal is subjected to frequency modulation and is recorded. At this time, in the frequency modulation circuit 705, a carrier signal of a higher carrier frequency than in a conventional case is selected by an instruction from the system controller so as to obtain a high-band signal, and frequency modulation is carried out by using this selected carrier signal. On the other hand, when the normal recording mode is designated by the system controller, it is not necessary to effect a very severe reduction of the noise component. Therefore, the changeover switch 702 is connected to the terminal N in the drawing, the input luminance signal which has not passed through the waveform conversion circuit 700 and the fixed emphasis circuit 701 is selected, the reduction of the noise component is performed only by the non-linear emphasis circuit 703, and the signal is subjected to frequency modulation and is then recorded. At this time, in the frequency modulation circuit 705, because normal recording is effected, a carrier signal of a carrier frequency identical with a conventional one is selected by an instruction from the system controller, and frequency modulation is carried out by using this selected carrier signal.

Meanwhile, during reproduction, the user selects either the high-quality reproduction mode for reproducing the signal recorded in the high-quality recording mode or the normal reproduction mode for reproducing the signal recorded in the normal recording mode. Alternatively, an arrangement may be provided such that the recording mode in which recording has been effected on the magnetic sheet can be detected, by detecting a detection hole or the like provided in a jacket for holding the magnetic sheet, or a pilot signal or the like for detecting a recording mode is multiplexed with a recording signal and is recorded in advance, and is detected at the time of reproduction, thereby allowing the system controller to automatically select a corresponding mode. Thus, in accordance with the reproduction mode selected by the system controller, the changeover switch 717 is connected to the terminal S in the drawing in the case of the high-quality reproduction mode and to the terminal N in the drawing in the case of the normal reproduction mode. As a result, the signal recorded in the high-quality recording mode is subjected to the reverse processing of the frequency modulation processing and the noise component reduction processing carried out on the recording system side, by the reproduction system-side frequency demodulation circuit 713, the fixed de-emphasis circuit 715, and the waveform reverse-conversion circuit 716. Meanwhile, the signal recorded in the normal recording mode is subjected to reverse processing of the frequency modulation processing and noise component reduction processing carried out on the recording system side, by the reproduction system-side frequency demodulation circuit 713 and the non-linear de-emphasis circuit 714. Thus, it is possible to effect high-quality recording and reproduction in the high-quality recording and reproduction mode in addition to the conventional recording and reproduction in the normal recording and reproduction mode.

FIGS. 8(a), 8(b), 9(a), 9(b), 10(a), and 10(b) are diagrams illustrating other examples of the waveform conversion circuit 700 and the waveform reverse-conversion circuit 716 respectively shown in FIGS. 7(b) and 7(c). The same components that are identical with those of FIGS. 7(b) and 7(c) are denoted by the same reference numerals, and a description thereof will be omitted.

Figure 8A:
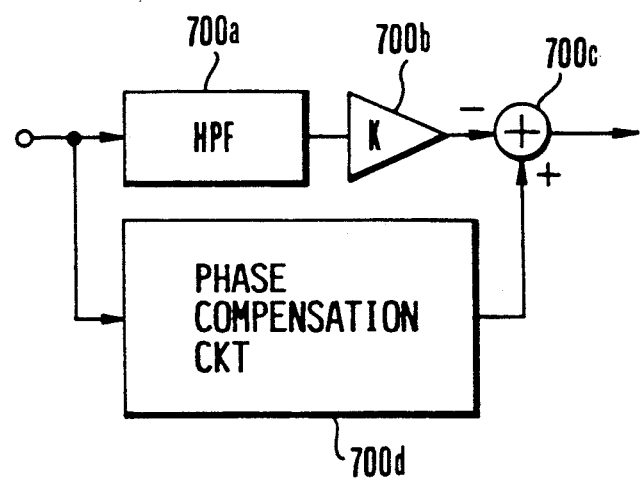
FIGS. 8(a) and 8(b) are schematic diagrams respectively illustrating other examples of the waveform conversion circuit and the waveform reverse-conversion circuit of FIG. 7(a) including a phase compensation circuit.
Figure 8B:
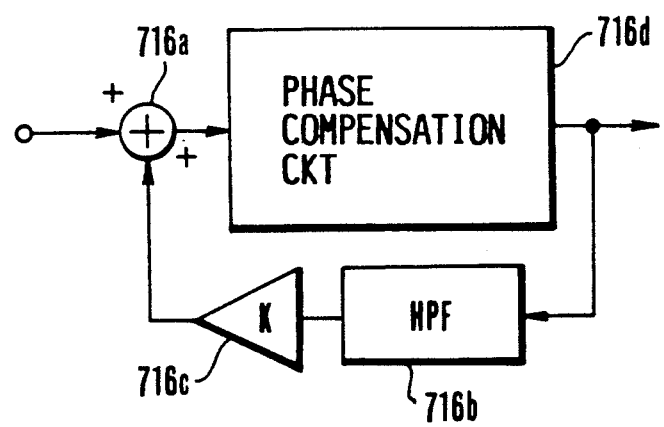

In FIG. 8(a), a phase compensation circuit 700d is provided before the input luminance signal is input to the plus (+) terminal of the adder 700c, so that precise subtraction can be effected by the adder 700c at the time when the high-frequency component of the luminance signal multiplied by the coefficient K is subtracted from the input luminance signal, so as to enable phase compensation. In FIG. 8(b), the arrangement is such that the signal output from the adder 716a is supplied to the HPF 716b after passing through a phase compensation circuit 716d, so as to allow phase compensation to be performed. If these arrangements are adopted, it is possible to effect the waveform conversion during recording and the waveform inversion during reproduction with high accuracy.

Figure 9A:
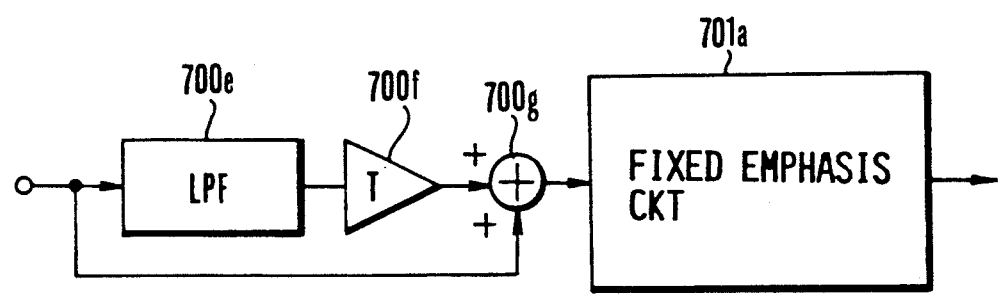
FIGS. 9(a) and 9(b) are schematic diagrams respectively illustrating other examples of the waveform conversion circuit and the waveform reverse-conversion circuit of FIG. 7(a) including a low-pass filter.
Figure 9B:
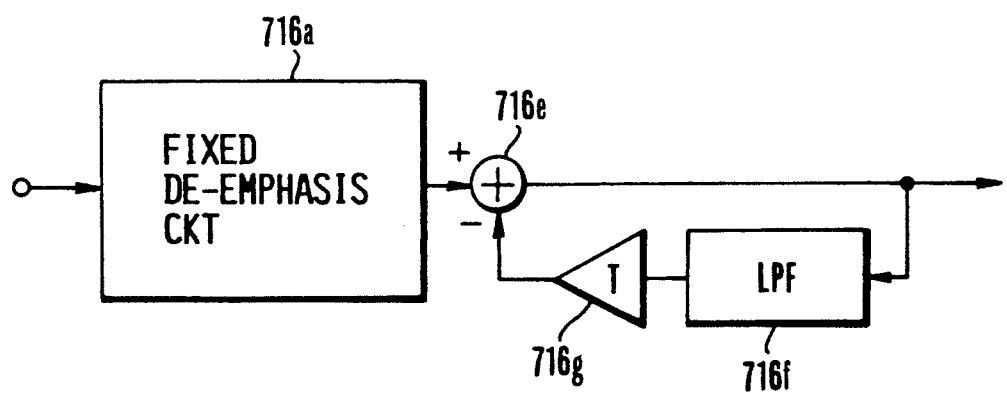

FIG. 9(a) shows an arrangement in which a low-pass filter (LPF) 700e is employed instead of the HPF 700a used in FIG. 7(b). The low-frequency component is separated from the input luminance signal by the LPF 700e, is multiplied by a coefficient T (T < 1) by means of a coefficient multiplication circuit 700f, and is supplied to the plus terminal of an adder 700g. Meanwhile, the input luminance signal is supplied as it is to the other plus terminal of the adder 700g, and a luminance signal to which the low-frequency component is added by a predetermined amount is output from the adder 700g. Although in the arrangement shown in FIG. 7(b) the high-frequency component of the luminance signal is suppressed by a predetermined amount, the above-described processing makes it possible to obtain an effect similar to the one in which the high-frequency component is suppressed by a predetermined amount by adding the low-frequency component by a predetermined amount.

The luminance signal to which a predetermined amount of the low-frequency component is added is supplied to the fixed emphasis circuit 701a, and the high-frequency component is emphasized, and is subjected to frequency modulation in the same manner as in FIG. 7(a) and is then recorded on a magnetic sheet.

In addition, during reproduction, after the reproduction signal is subjected to frequency demodulation, the high-frequency component thereof amplified by emphasis during recording is suppressed by the fixed de-emphasis circuit 716a having opposite characteristics to those of the recording system-side fixed emphasis circuit 701a, and is supplied to an LPF 716f via an adder 716e. Then, a low-frequency component added during recording is obtained by the LPF 716f and a coefficient multiplication circuit 716g which are respectively equivalent to the LPF 700e and the coefficient multiplication circuit 700f provided in the above-described recording system, and is supplied to the minus terminal of the adder 716e to effect negative feedback, thereby restoring the reproduced luminance signal.

In the above-described circuit configuration, the characteristics of the fixed emphasis circuit 701a and the fixed de-emphasis circuit 716a are respectively different from those shown in FIGS. 7(b) and 7(c). However, if circuits having identical characteristics are used, it suffices if, in the recording system, an attenuator is provided on the input side or the output side of the adder 700g, and the signal is supplied to the fixed emphasis circuit 701 after the level of the entire predetermined amount is lowered, while, in the reproduction system, an amplifier having opposite characteristics to those of the above-described attenuator is provided on the output side of the fixed de-emphasis circuit 716a.

Figure 10A:
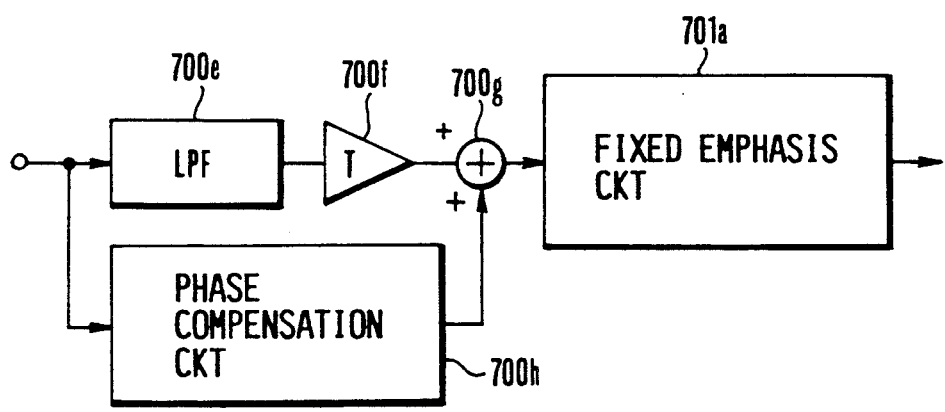
FIGS. 10(a) and 10(b) are schematic diagrams respectively illustrating other examples of the waveform conversion circuit and the waveform reverse-conversion circuit of FIG. 7(a) including both a phase compensation circuit and a low-pass filter.
Figure 10B:
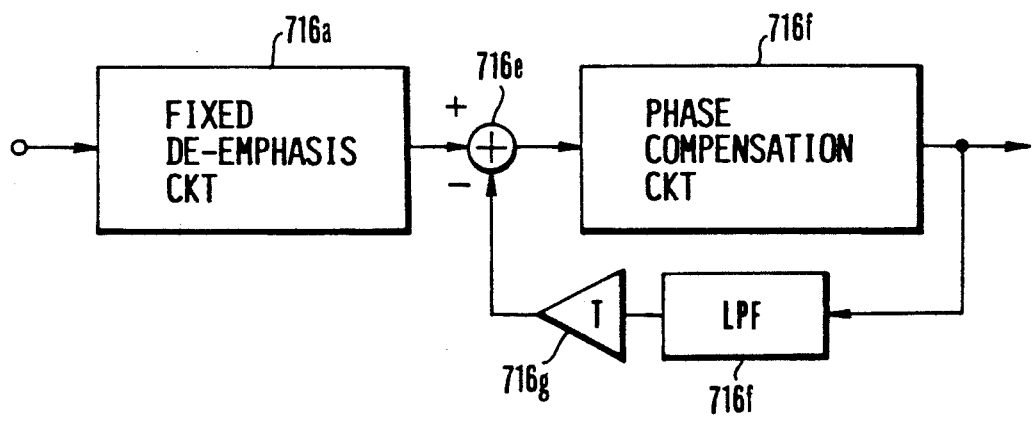

Furthermore, as shown in FIGS. 10(a) and 10(b), if phase compensation circuits 700h and 716h are provided in the circuit configuration shown in FIGS. 9(a)

and 9(b) in the same manner as FIGS. 8(a) and 8(b), it is possible to improve the accuracy in a case where the waveform conversion during recording and the waveform reversion-conversion during reproduction are carried out by using LPFs.

As the waveform conversion circuit and the waveform reverse-conversion circuit shown in this embodiment, it is possible to use a lug-type HPF, LPF or a linear phase-type filter such as a cosine equalizer in addition to the examples shown above. If the circuit configuration is such that it has the effect of attenuating a given frequency band to a predetermined level, such a circuit configuration can be applied to the present invention, and a similar effect can be obtained.

In addition, although in this embodiment the emphasis circuit connected to the rear stage of the waveform conversion circuit is fixed, it may be non-linear.

Figure 11:
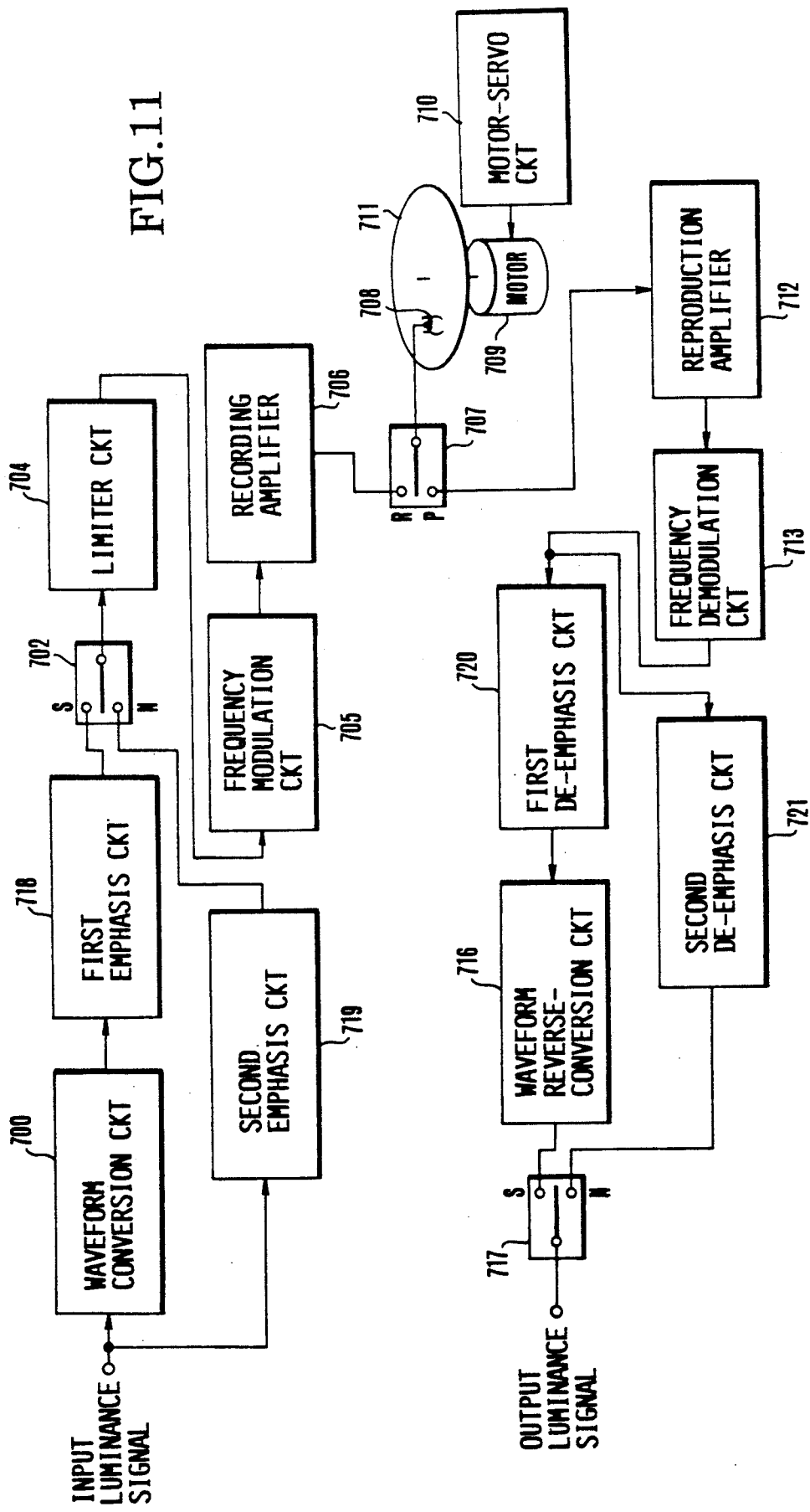
FIG. 11 is a schematic diagram of a still video apparatus in accordance with a second embodiment of the present invention.

FIG. 11 illustrates a schematic diagram of a second embodiment of the present invention. In the drawing, those components that are similar to those of FIG. 7(a) are denoted by the same reference numerals, and a description thereof will be omitted.

In FIG. 11, a first emphasis circuit 718 and a second emphasis circuit 719 are provided instead of the fixed emphasis circuit 701 and the non-linear emphasis circuit 703 shown in FIG. 7(a), and a first de-emphasis circuit 720 and a second de-emphasis circuit 721 are provided instead of the non-linear de-emphasis circuit 714 and the fixed de-emphasis circuit 715. The first and second emphasis circuits 718 and 719 are non-linear emphasis circuits having different characteristics. In other words, in the recording system, the first emphasis circuit 718 applies non-linear emphasis to the luminance signal whose high-frequency component has been suppressed by the preceding waveform conversion circuit 700, while the second emphasis circuit 719 applies non-linear emphasis to the luminance signal input in a conventional manner. The signal emphasized by these emphasis circuits is selectively supplied to the limiter circuit 704 by the changeover switch 702 in the same way as FIG. 7(a). Since the changeover operation of the changeover switch 702 is identical with that shown in FIG. 7(a), a description thereof will be omitted.

The first and second de-emphasis circuits 720 and 721 are non-linear emphasis circuits having different characteristics. The first de-emphasis circuit 720 has opposite characteristics to those of the first emphasis circuit 718, while the second de-emphasis circuit 721 has opposite characteristics to those of the second emphasis circuit 719. The reproduced signal is subjected to frequency demodulation by the frequency demodulation circuit 713, and is then supplied to the first and second de-emphasis circuits 720 and 721, respectively. The luminance signal restored by the respective systems is selectively output by the changeover switch 717 in the same way as in FIG. 7(a).

With this circuit configuration, it is possible to obtain a similar effect to that of the first embodiment shown in FIG. 7(a). At the same time, since the non-linear emphasis circuits are provided independently in correspondence with the types of input signals, it is unnecessary to take into consideration the matching of emphasis as compared with a case where the signal is allowed to pass through emphasis circuits in a multiplicity of stages, so that optimum emphasis can be effected.

FIGS. 12(a), 12(b), 12(c), 12($d_1$), 12($d_2$), 12(e), and 12(f) are schematic diagrams of a still video apparatus in accordance with a third embodiment of the present invention.

First, the operation at the time of recording will be described.

Figure 12A:
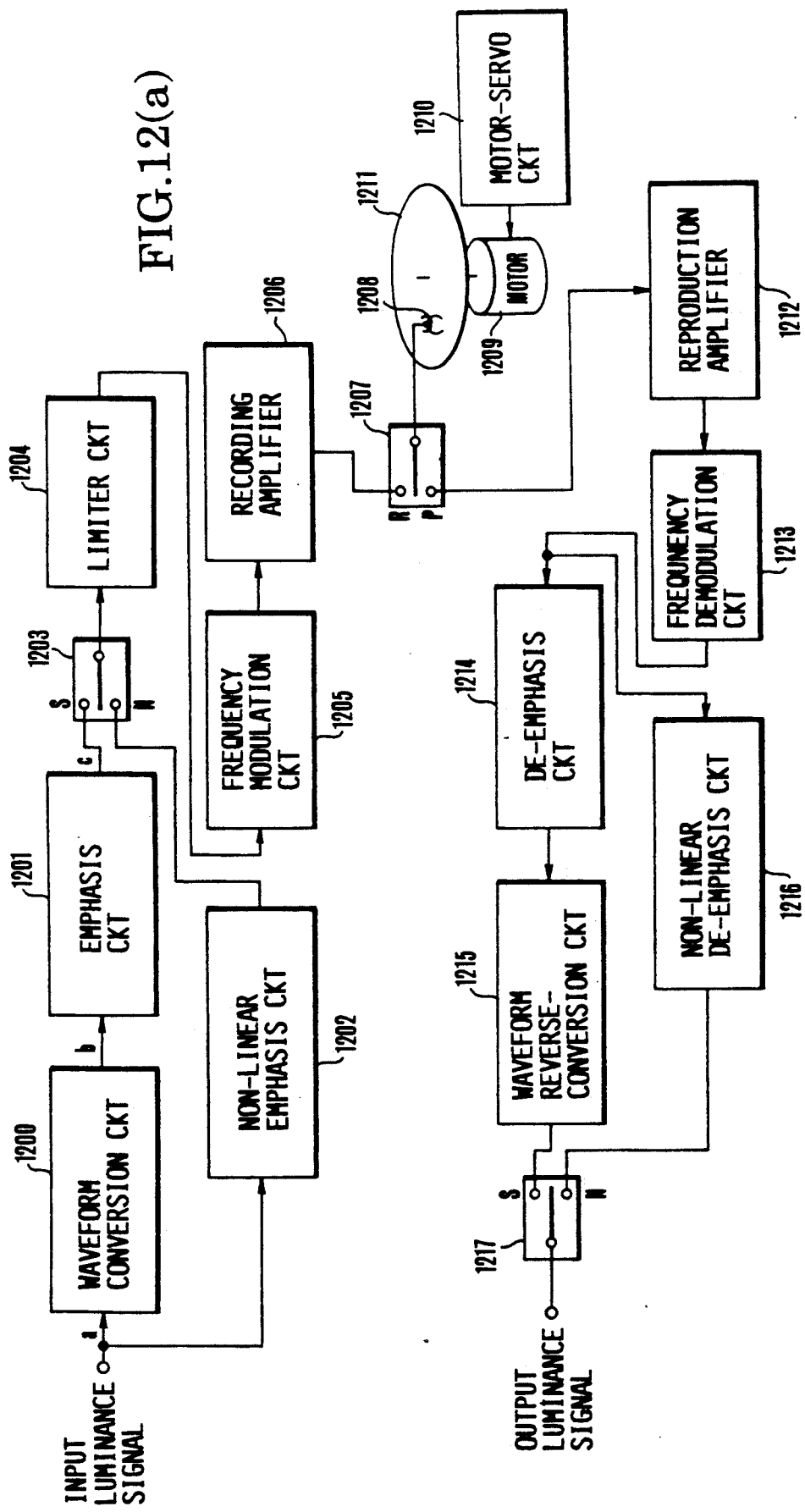
Figure 12B:
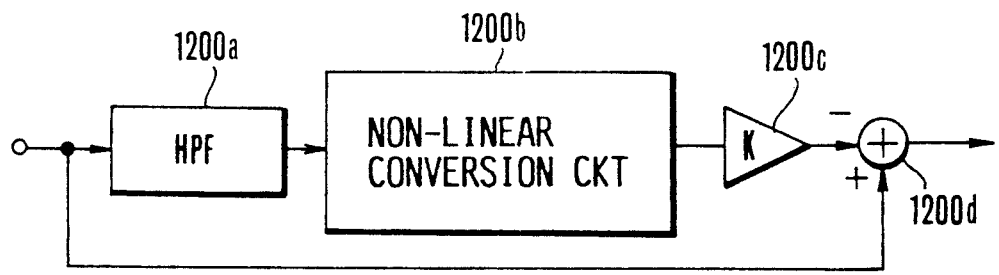

In FIG. 12(a), a waveform conversion circuit 1200 is configured by a circuit such as the one shown in FIG. 12(b).

In FIG. 12(b), a high-pass filter (HPF) 1200a extracts the high-frequency component of the input luminance signal, and the high-frequency component of the luminance signal extracted here is supplied to a non-linear conversion circuit 1200b. The non-linear conversion circuit 1200b outputs the signal with a greater amplitude than a predetermined amplitude (level) as it is, and continuously attenuates the signal with an amplitude of a predetermined level or below. The non-linear conversion circuit 1200b is configured by a circuit such as the one shown in FIG. 12(f). The high-frequency component of the luminance signal subjected to non-linear conversion processing by the non-linear conversion circuit 1200b is supplied to a coefficient multiplication circuit 1200c, where it is multiplied by the coefficient K (K<1), the signal is supplied to the minus (−) terminal of an adder 1200d. Meanwhile, the input luminance signal is supplied to the plus (+) terminal of the adder 1200d, and a luminance signal whose high-frequency component is suppressed by a predetermined amount is output from the adder 1200d.

The high-frequency component of the signal output from the waveform conversion circuit 1200 is amplified by an emphasis circuit 1201. The time constant of each circuit is set in such a manner that the high-frequency component amplified by the emphasis circuit 1201 becomes the high band-side component among the frequency component suppressed by the waveform conversion circuit 1200.

In the emphasis circuit 1201, either fixed emphasis or non-linear emphasis may be carried out. However, if non-linear emphasis is performed, the effect of the noise reduction can be improved further.

Figure 12C:
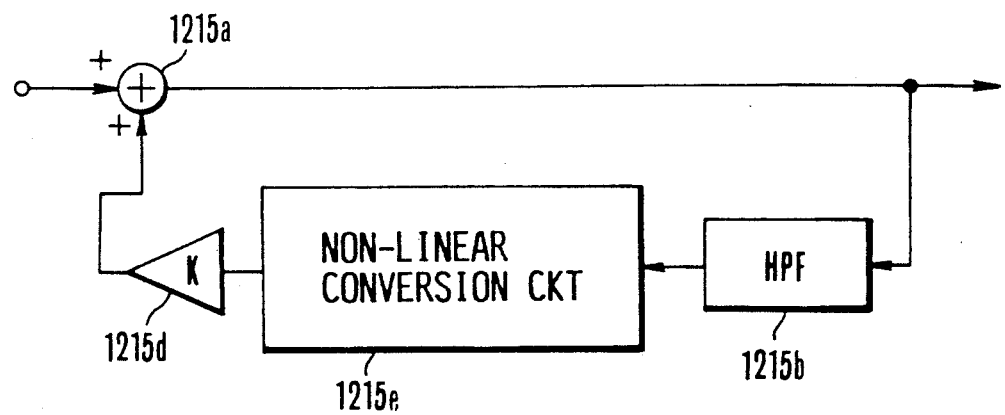
Figure 12F:
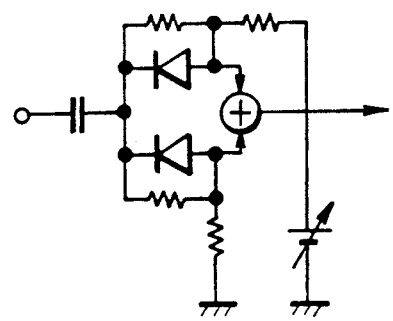
FIG. 12(f) is a specific circuit diagram of a non-linear conversion circuit shown in FIGS. 12(b) and 12(c)
Figure 12:
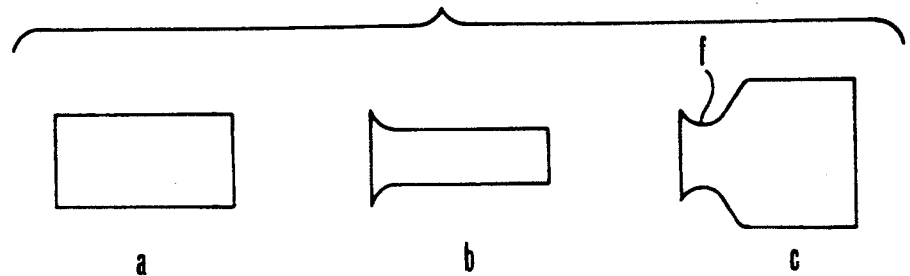
Figure 12:
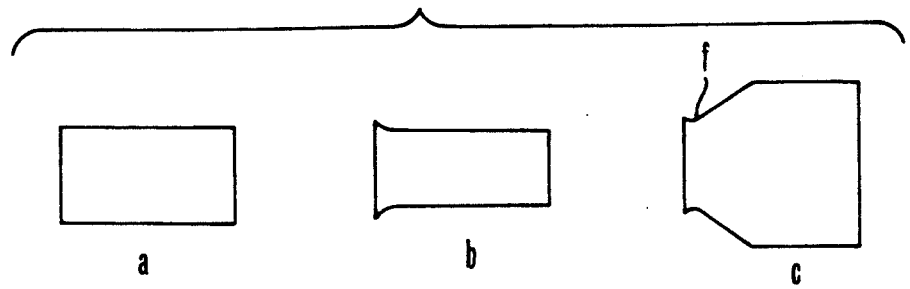

FIGS. 12($d_1$), 12($d_2$), and 12(e) show how the waveform of the signal changes due to the aforementioned circuits. FIG. 12($d_1$) is a diagram illustrating a change in the waveform in a case where a sine sweep waveform signal a of large amplitude is input. Attenuation occurs in the high-frequency component due to the waveform conversion circuit 1200 in the manner of a waveform b, and the high-frequency component among the attenuated frequency component is then amplified by the emphasis circuit 1201 in the manner of a waveform c.

Figure 12E:
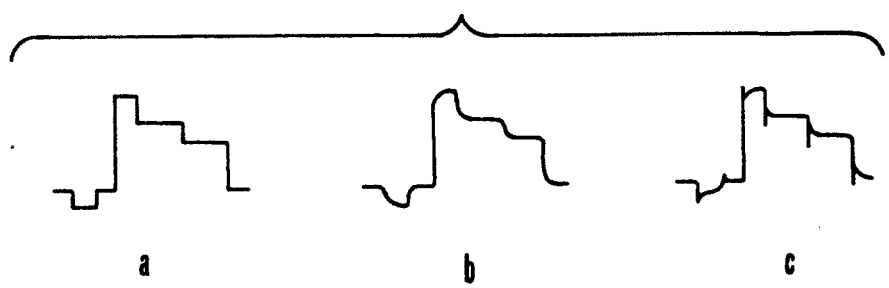
FIG. 12(e) is a waveform diagram at respective operating positions in cases where a luminance signal is input.

In addition, FIG. 12($d_2$) is a diagram illustrating a change in the waveform in a case where a sine sweep waveform signal a of small amplitude is input. The high-frequency component is attenuated slightly by the waveform conversion circuit 1200 in the manner of a waveform b, and the high-frequency component among the attenuated frequency component is then amplified by the emphasis circuit 1201 in the manner of a waveform c. FIG. 12(e) shows a change in the waveform in a case where a luminance signal a is input. In other words, the high-frequency component is suppressed by the waveform conversion circuit 1200, the waveform thus becomes such that the rising and falling edges of the signal become blunt, the high-band component among the suppressed frequency component is subjected to emphasis by the emphasis circuit 1201 to assume a waveform c.

Thus, it is possible to reduce the noise component, since the high-frequency component corresponding to the rising and falling edge portions of the luminance signal is temporarily suppressed and the high-frequency component among the suppressed frequency component is emphasized. At the same time, since it is possible to ensure that the level of the spike-like pulse at the edge portion which occurs as a result of emphasis can be made neither too high nor too low, it is possible to obtain a margin for the inverted white peak. In addition, in the above-described circuit, since the frequency component suppressed by the waveform conversion circuit 1200, rather than the frequency component amplified by the emphasis circuit 1201, is wider in the vicinity of the low-frequency component, a decline in the level occurs in some low-frequency component with respect to the signal of large amplitude, as shown in the waveform c in FIG. 12($d_1$) (f in the drawing). However, since the distribution of the noise component which is produced after demodulation in the process of frequency modulation and demodulation becomes a triangular spectrum, as shown in FIG. 1(a), an increase in the noise component in the low-frequency component is of such a measure that it is substantially unnoticeable.

Meanwhile, with respect to the signal of small amplitude, as shown in the waveform c in FIG. 12($d_2$), since the level does not substantially decline in some low-frequency component (f in the drawing) due to the operation of the non-linear conversion circuit 1200b, so that there is substantially no increase in the noise component in the low-frequency component.

The luminance signal thus processed is supplied to a terminal (S in the drawing) of a changeover switch 1203, and is supplied to a limiter circuit 1204 via the changeover switch 1203.

The signal supplied to this limiter circuit 1204 has already subjected to a reduction in the noise component by the preceding waveform conversion circuit 1200 and the emphasis circuit 1201 Hence, the emphasized signal is subjected to suppression of the level of the spike-like pulses at the edge portions by the limiter circuit 1204, and is then supplied to a frequency modulation circuit 1205.

Subsequently, after being subjected to frequency modulation by the frequency modulation circuit 1205, the signal is amplified by a recording amplifier 1206, and, at the time of recording, the amplified frequency modulated luminance signal is supplied to a magnetic head 1208 via a changeover switch 1207 connected to an R side by a system controller (not shown), and is then recorded on a magnetic sheet 1211 being rotated at a fixed speed by a motor 1209.

The rotation of the motor 1209 is controlled in response to an operation instruction signal from the system controller (not shown) by means of a motor-servo circuit 1210.

Meanwhile, during reproduction, the operation is carried out as follows: The motor 1209 is rotated by the motor-servo circuit 1210 at a fixed speed in accordance with an instruction from the system controller (not shown), a magnetic sheet 1211 is rotated at a fixed speed by the motor 1209, and the signal recorded on the magnetic sheet 1211 is reproduced by a magnetic head 1208. During reproduction, the reproduced signal is supplied to a reproduction amplifier 1212 via the changeover switch 1207 connected to a P side by the system controller (not shown). After being amplified by the reproduction amplifier 1212, the signal is demodulated by a frequency demodulation circuit 1213 and is then supplied to a de-emphasis circuit 1214.

The de-emphasis circuit 1214 has opposite characteristics to those of the non-linear emphasis circuit 1201 provided in the above-described recording system, and suppresses to an original level the high-frequency component amplified during recording and then supplies the same to a waveform reverse-conversion circuit 1215.

The waveform reverse-conversion circuit 1215 is configured, as shown in FIG. 12(c), and employs an HPF 1215b, a non-linear conversion circuit 1215c and a coefficient multiplication circuit 1215d having characteristics completely identical to those of the HPF 1200a, the non-linear conversion circuit 1200b and the coefficient multiplication circuit 1200c, so as to restore the high-frequency component of the luminance signal suppressed by a predetermined amount during recording. In addition, since an adder 1215a is employed to effect positive feedback, as illustrated in the drawing, the reproduced luminance signal is restored. Incidentally, with respect to the coefficient multiplication circuit 1215d, since the coefficient K which is multiplied is given by $K < 1$, in the same way as the coefficient multiplication circuit 1200c, there is no possibility of oscillating at the time when the positive feedback is effected.

The reproduced luminance signal restored and output by the waveform reverse-conversion circuit 1215 is supplied to a terminal S of a changeover switch 1217, and is output via the changeover switch 1217.

The embodiment shown in FIG. 12(a) is provided with the recording system-side changeover switch 1203 and the reproducing system-side changeover switch 1217. The arrangement is such that, on the recording system side, the input luminance signal is supplied to the terminal N of the changeover switch 1203 via the de-emphasis circuit 1202 without passing through the waveform conversion circuit 1200 and the emphasis circuit 1201, while, on the reproducing system side, the reproduction signal is supplied to the terminal N of the changeover switch 1217 via a non-linear de-emphasis circuit 1216 without passing through the de-emphasis circuit 1214 and the waveform reverse-conversion circuit 1215.

The changeover operation of these changeover switches 1203 and 1217 is controlled by the system controller (not shown). The apparatus shown in this embodiment is provided with a high-quality recording mode for effecting recording by making use of the high band so as to record the luminance signal with higher quality than in the case of a conventional apparatus and with a normal recording mode for effecting recording in a conventional manner. When the high-quality recording mode is designated by the system controller during recording, a more severe reduction of the noise component than in the case of a conventional apparatus becomes necessary, so that the changeover switch 1203 is connected to the terminal S in the drawing, the signal which has been subjected to processing for noise component reduction is selected by using the waveform conversion circuit 1200 and the emphasis circuit 1201, as described before, and this signal is subjected to frequency modulation and is recorded. At this time, in the frequency modulation circuit 1205, a carrier signal of a higher carrier frequency than in a conventional case is selected by an instruction from the system controller so as to obtain a high-band signal, and frequency modulation is carried out by using this selected carrier signal. On the other hand, when the normal recording mode is designated by the system controller, it is not necessary to effect a very severe reduction of the noise component. Therefore, the changeover switch 1203 is connected to the terminal N in the drawing, the reduction of the noise component is performed only by the non-linear emphasis circuit 1202 without passing through the waveform conversion circuit 1200 and the emphasis circuit 1201, and the signal is subjected to frequency modulation and is then recorded. At this time, in the frequency modulation circuit 1205, because normal recording is effected, a carrier signal of a carrier frequency identical with a conventional one is selected by an instruction from the system controller, and frequency modulation is carried out by using this selected carrier signal.

The non-linear emphasis circuit 1202 is equivalent to a conventionally used dynamic emphasis circuit, and amplifies the high-frequency component non-linearly in response to the level of the input signal.

Meanwhile, during reproduction, the user selects either the high-quality reproduction mode for reproducing the signal recorded in the high-quality recording mode or the normal reproduction mode for reproducing the signal recorded in the normal recording mode. Alternatively, an arrangement may be provided such that the recording mode in which recording has been effected on the magnetic sheet can be detected, by detecting a detection hole or the like provided in a jacket for holding the magnetic sheet, or a pilot signal or the like for detecting a recording mode is multiplexed with a recording signal and is recorded in advance, and is detected at the time of reproduction, thereby allowing the system controller to automatically select a corresponding mode. Thus, in accordance with the reproduction mode selected by the system controller, the changeover switch 1217 is connected to the terminal S in the drawing in the case of the high-quality reproduction mode and to the terminal N in the drawing in the case of the normal reproduction mode. As a result, the signal recorded in the high-quality recording mode is subjected to the reverse processing of the frequency modulation processing and the noise component reduction processing carried out on the recording system side, by the reproduction system-side frequency demodulation circuit 1213, the de-emphasis circuit 1214, and the waveform reverse-conversion circuit 1215. Meanwhile, the signal recorded in the normal recording mode is subjected to reverse processing of the frequency modulation processing and noise component reduction processing carried out on the recording system side, by the reproduction system-side frequency demodulation circuit 1213 and the non-linear de-emphasis circuit 1216. Thus, it is possible to effect high-quality recording and reproduction in the high-quality recording and reproduction mode in addition to the conventional recording and reproduction in the normal recording and reproduction mode.

The non-linear de-emphasis circuit 1216 has opposite characteristics to those of the non-linear emphasis circuit 1202 provided in the aforementioned recording system, and suppresses to its original level the high-frequency component amplified during recording.

As described above, in this embodiment, a description has been given of a case where, at the time of the high-quality recording mode, the noise component is reduced without accompanying an adverse effect on the signal such as the inverted white peak. However, if the waveform conversion circuit and the emphasis circuit in this embodiment are used instead of the dynamic emphasis circuit conventionally used on the recording side, it is possible to reduce the noise component more than a conventional apparatus. In addition, since the number of circuits to be added is small, the configuration does not become very complicated, and the added circuits and the conventional emphasis circuit can be readily changed over by means of changeover switches. Hence, compatibility with the conventional apparatus can be easily ensured.

In addition, with respect to the waveform conversion circuit and the waveform reverse-conversion circuit of this embodiment, an arrangement may be alternatively provided such that a phase compensation circuit for adjusting the phase may be provided to each system at the time when, in order to improve the accuracy of conversion or reverse-conversion, the high-frequency component signal extracted during recording and provided with non-linear conversion processing and coefficient K multiplication processing is subtracted from the input luminance signal, or at the time when signal restoring processing is performed through a positive feedback loop during reproduction. Alternatively, an arrangement may be provided such that, in the waveform conversion circuit, the low-frequency component signal is extracted by using an LPF instead of an HPF, the extracted signal is subjected to non-linear conversion processing and coefficient T (T<1) multiplication processing, is conversely added to the input signal, is converted in such a manner that the high-frequency component is suppressed in relation to the low-frequency component, while, in the waveform reverse-conversion circuit, reverse-conversion processing is carried out to restore the signal. At this juncture, a phase compensation circuit such as the one described above may be provided.

As the waveform conversion circuit and the waveform reverse-conversion circuit shown in this embodiment, it is possible to use a lug-type HPF, LPF or a linear phase-type filter such as a cosine equalizer in addition to the examples shown above. If the circuit configuration is such that it has the effect of attenuating a given frequency band to a predetermined level, such a circuit configuration can be applied to the present invention, and a similar effect can be obtained.

FIGS. 13(a), 13(b), 13(c), 13($d_1$), 13($d_2$), 13(e), and 13(f) are schematic diagrams of a still video apparatus in accordance with a fourth embodiment of the present invention.

First, a description will be given of the operation during recording.

Figure 13A:
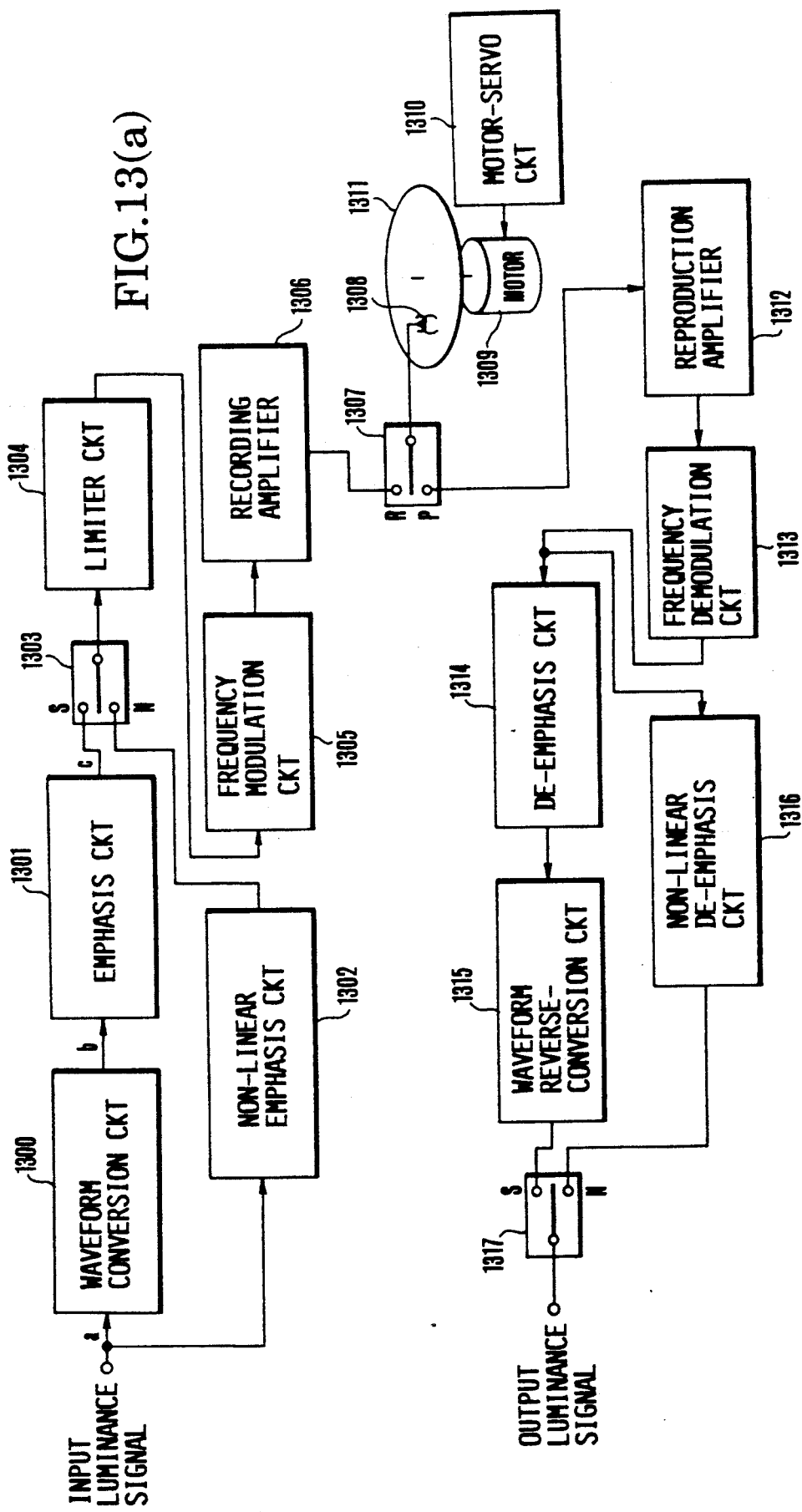
Figure 13B:
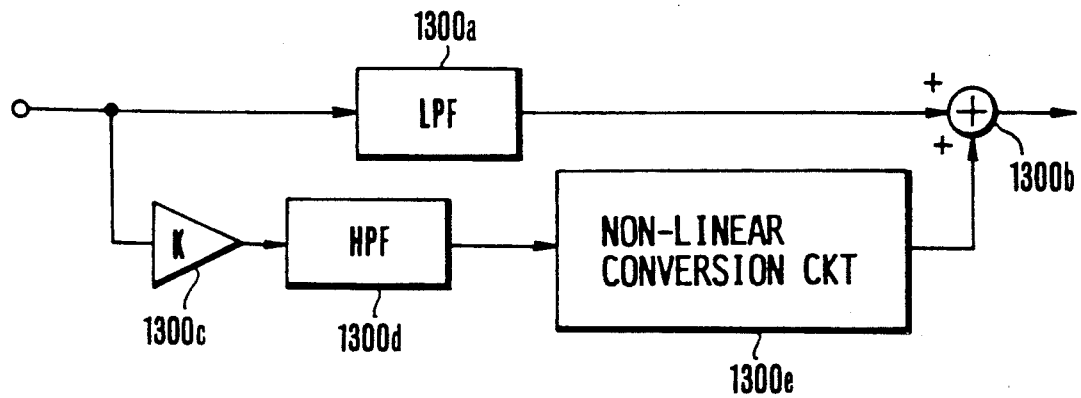

In FIG. 13(a), a waveform conversion circuit 1300 is configured by a circuit such as the one shown in FIG. 13(b).

In FIG. 13(b), a low-pass filter (LPF) 1300a is adapted to extract the low-frequency component of the input luminance signal, and the low-frequency component of the luminance signal extracted here is supplied to one plus (+) terminal of an adder 1300b. Meanwhile, a signal which is obtained by being subjected to the following processing is supplied to the other plus (+) terminal of the adder 1300b.

In other words, after the input luminance signal is supplied to a coefficient multiplication circuit 1300c where it is multiplied by the coefficient K (K<1), the luminance signal is supplied to a high-pass filter (HPF) 1300d, and the high-frequency component of the luminance signal whose overall level is suppressed is extracted at the coefficient multiplication circuit 1300c.

Subsequently, the extracted high-frequency component is supplied to a non-linear conversion circuit 1300e. The non-linear conversion circuit 1300e outputs as it is the signal having smaller amplitude than a predetermined amplitude, while it continuously suppresses the signal of the predetermined amplitude or above. The non-linear conversion circuit 1300e is configured by a circuit such as the one shown in FIG. 13(*f*). The high-frequency component of the luminance signal subjected to non-linear conversion processing by the non-linear conversion circuit 1300e is supplied to the plus (+) terminal of the adder 1300b.

Thus, the low-frequency component of the input luminance signal is supplied to the adder 1300b from the LPF 1300a, the high-frequency component signal in which the input luminance signal is subjected to suppression and non-linear conversion processing is supplied thereto from the non-linear conversion circuit 1300e. As they are added, a luminance signal whose high-frequency component has been suppressed by a predetermined amount is output.

The high-frequency component of the signal output from the waveform conversion circuit 1300 is amplified by an emphasis circuit 1301. The time constant of each circuit is set in such a manner that the high-frequency component amplified by the emphasis circuit 1301 becomes the high band-side component among the frequency component suppressed by the waveform conversion circuit 1300.

In the emphasis circuit 1301, either fixed emphasis or non-linear emphasis may be carried out. However, if non-linear emphasis is performed, the effect of the noise reduction can be improved further.

Figure 13C:
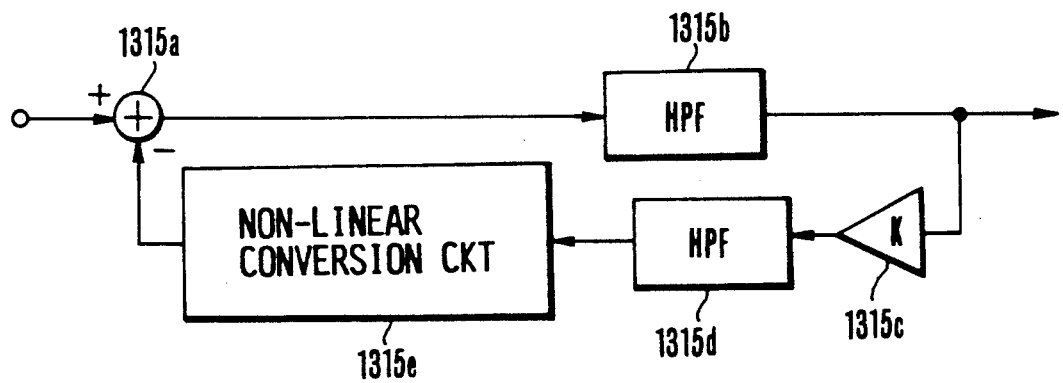
Figure 13F:
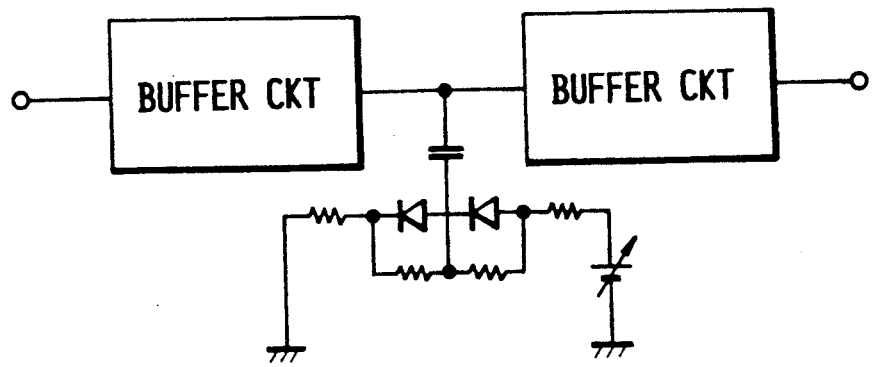
FIG. 13(f) is a specific circuit diagram of a non-linear conversion circuit shown in FIGS. 13(b) and 13(c)
Figure 13:
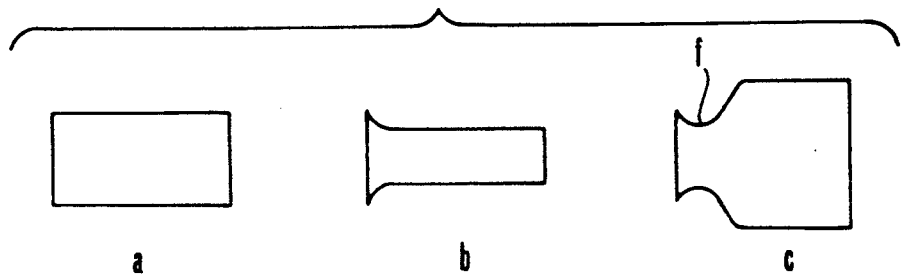
Figure 13:
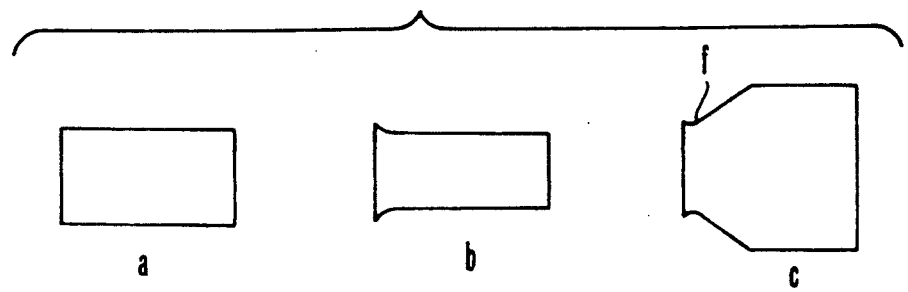
Figure 13E:
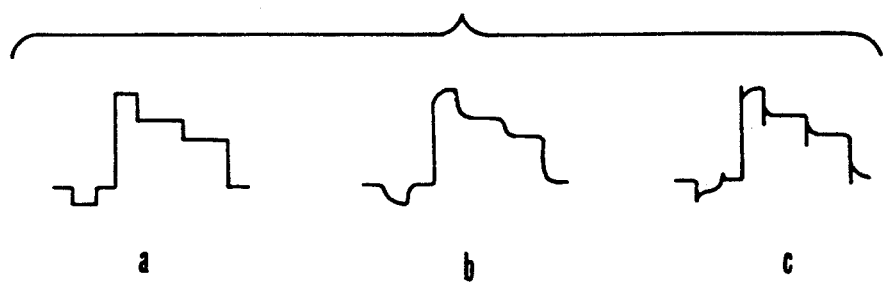
FIG. 13(e) is a waveform diagram at respective operating positions in cases where a luminance signal is input.

FIGS. 13($d_1$), 13($d_2$), and 13(*e*) show how the waveform of the signal changes due to the aforementioned circuits. FIG. 13($d_1$) is a diagram illustrating a change in the waveform in a case where a sine sweep waveform signal a of large amplitude is input. Attenuation occurs in the high-band component due to the waveform conversion circuit 1300 in the manner of a waveform b, and the high-band component among the attenuated frequency component is then amplified by the emphasis circuit 1301 in the manner of a waveform c.

In addition, FIG. 13($d_2$) is a diagram illustrating a change in the waveform in a case where a sine sweep waveform signal a of small amplitude is input. The high-band component is attenuated slightly by the waveform conversion circuit 1300 in the manner of a waveform b, and the high-band component among the attenuated frequency component is then amplified by the emphasis circuit 1301 in the manner of a waveform c. FIG. 13(*e*) shows a change in the waveform in a case where a luminance signal a is input. In other words, the high-frequency component is suppressed by the waveform conversion circuit 1300, the waveform thus becomes such that the rising and falling edges of the signal become blunt, the high-band component among the suppressed frequency component is subjected to emphasis by the emphasis circuit 1301 to assume a waveform c.

Thus, it is possible to reduce the noise component, since the high-frequency component corresponding to the rising and falling edge portions of the luminance signal is temporarily suppressed and the high-band component among the suppressed frequency component is emphasized. At the same time, since it is possible to ensure that the level of the spike-like pulse at the edge portion which occurs as a result of emphasis can be made neither too high nor too low, it is possible to obtain a margin for the inverted white peak. In addition, in the above-described circuit, since the frequency component suppressed by the waveform conversion circuit 1300, rather than the frequency component amplified by the emphasis circuit 1301, is wider in the vicinity of the low-frequency component, a decline in the level occurs in some low-frequency component with respect to the signal of large amplitude, as shown in the waveform c in FIG. 13($d_1$) (f in the drawing). However, since the distribution of the noise component which is produced after demodulation in the process of frequency modulation and demodulation becomes a triangular spectrum, as shown in FIG. 1(a), an increase in the noise component in the low-frequency component is of such a measure that it is substantially unnoticeable.

Meanwhile, with respect to the signal of small amplitude, as shown in the waveform c in FIG. 13($d_2$), since the level does not substantially decline in some low-frequency component (f in the drawing) due to the operation of the non-linear conversion circuit 1300b, so that there is substantially no increase in the noise component in the low-frequency component.

In this embodiment, since the arrangement is such that the high-frequency component of the luminance signal is separated from the low-frequency component, and the high-frequency component is subjected to suppression and non-linear conversion processing, by changing the characteristics of the LPF and the HPF used in separation it is possible to provide the input signal with optimum processing, so that the degree of freedom in design can be enhanced.

The luminance signal thus processed is supplied to a terminal (S in the drawing) of a changeover switch 1303, and is supplied to a limiter circuit 1304 via the changeover switch 1303. The emphasized signal is subjected to suppression of the level of the spike-like pulses at the edge portions by the limiter circuit 1304, and is then supplied to a frequency modulation circuit 1305.

Subsequently, after being subjected to frequency modulation by the frequency modulation circuit 1305, the signal is amplified by a recording amplifier 1306, and, at the time of recording, the amplified frequency modulated luminance signal is supplied to a magnetic head 1308 via a changeover switch 1307 connected to an R side by a system controller (not shown), and is then recorded on a magnetic sheet 1311 being rotated at a fixed speed by a motor 1309.

The rotation of the motor 1309 is controlled in response to an operation instruction signal from the system controller (not shown) by means of a motor-servo circuit 1310.

Meanwhile, during reproduction, the operation is carried out as follows: The motor 1309 is rotated by the motor-servo circuit 1310 at a fixed speed in accordance with an instruction from the system controller (not shown), a magnetic sheet 1311 is rotated at a fixed speed by the motor 1309, and the signal recorded on the magnetic sheet 1311 is reproduced by a magnetic head 1308. During reproduction, the reproduced signal is supplied to a reproduction amplifier 1312 via the changeover switch 1307 connected to a P side by the system controller (not shown). After being amplified by the reproduction amplifier 1312, the signal is demodulated by a frequency demodulation circuit 1313 and is then supplied to a de-emphasis circuit 1314.

The de-emphasis circuit 1314 has opposite characteristics to those of the non-linear emphasis circuit 1301 provided in the above-described recording system, and suppresses to an original level the high frequency component amplified during recording and then supplies the same to a waveform reverse-conversion circuit 1315.

The waveform reverse-conversion circuit 1315 is configured, as shown in FIG. 13(c), and the reproduction signal is input to the plus (+) terminal of an adder 1315a and is supplied to an HPF 1315b via the adder 1315a so as to restore the high-frequency component of the luminance signal suppressed by a predetermined amount during recording. The HPF 1315b is a filter which has a transfer function which satisfies the formula:

$$H_{(s)} = 1/G_{(s)}$$

where $G_{(s)}$ is a transfer function of the LPF 1300a shown in FIG. 13(b). The signal extracted by this HPF 1315b is supplied to a coefficient multiplication circuit 1315c.

The coefficient multiplication circuit 1315c, an HPF 1315d, and a non-linear conversion circuit 1315e which are provided in the reproduction system have characteristics identical with those of a coefficient multiplication circuit 1300c, an HPF 1300d, and a non-linear conversion circuit 1300e that are provided in the recording system. The signal extracted by the HPF 1315b is processed by these circuits, as described before, and the processed signal is supplied to the minus (−) terminal of the adder 1315a so as to effect negative feedback, as shown in the drawing, thereby reproducing the reproduction luminance signal.

The reproduced luminance signal restored and output by the waveform reverse-conversion circuit 1315 is supplied to a terminal S of a changeover switch 1317, and is output via the changeover switch 1317.

The embodiment shown in FIG. 13(a) is provided with the recording system-side changeover switch 1303 and the reproducing system-side changeover switch 1317. The arrangement is such that, on the recording system side, the input luminance signal is supplied to the terminal N of the changeover switch 1303 via the non-linear emphasis circuit 1302 without passing through the waveform conversion circuit 1300 and the emphasis circuit 1301, while, on the reproducing system side, the reproduction signal is supplied to the terminal N of the changeover switch 1317 via a non-linear de-emphasis circuit 1316 without passing through the de-emphasis circuit 1314 and the waveform reverse-conversion circuit 1315.

The changeover operation of these changeover switches 1303 and 1317 is controlled by the system controller (not shown). The apparatus shown in this embodiment is provided with a high-quality recording mode for effecting recording by making use of the high band so as to record the luminance signal with higher quality than in the case of a conventional apparatus and with a normal recording mode for effecting recording in a conventional manner. When the high-quality recording mode is designated by the system controller during recording, a more severe reduction of the noise component than in the case of a conventional apparatus becomes necessary, so that the changeover switch 1303 is connected to the terminal S in the drawing, the processed signal is selected by using the waveform conversion circuit 1300 and the emphasis circuit 1301, as described before, and this signal is subjected to frequency modulation and is recorded. At this time, in the frequency modulation circuit 1305, a carrier signal of a higher carrier frequency than in a conventional case is selected by an instruction from the system controller so as to obtain a high-band signal, and frequency modulation is carried out by using this selected carrier signal. On the other hand, when the normal recording mode is designated by the system controller, it is not necessary to effect a very severe reduction of the noise component. Therefore, the changeover switch 1303 is connected to the terminal N in the drawing, processing is performed only by the emphasis circuit 1302 without passing through the waveform conversion circuit 1300 and the emphasis circuit 1301, and the signal is subjected to frequency modulation and is then recorded. At this time, in the frequency modulation circuit 1305, because normal recording is effected, a carrier signal of a carrier frequency identical with a conventional one is selected by an instruction from the system controller, and frequency modulation is carried out by using this selected carrier signal.

The non-linear emphasis circuit 1302 is equivalent to a conventionally used dynamic emphasis circuit, and amplifies the high-frequency component non-linearly in response to the level of the input signal.

Meanwhile, during reproduction, the user selects either the high-quality reproduction mode for reproducing the signal recorded in the high-quality recording mode or the normal reproduction mode for reproducing the signal recorded in the normal recording mode. Alternatively, an arrangement may be provided such that the recording mode in which recording has been effected on the magnetic sheet can be detected, by detecting a detection hole or the like provided in a jacket for holding the magnetic sheet, or a pilot signal or the like for detecting a recording mode is multiplexed with a recording signal and is recorded in advance, and is detected at the time of reproduction, thereby allowing the system controller to automatically select a corresponding mode. Thus, in accordance with the reproduction mode selected by the system controller, the changeover switch 1317 is connected to the terminal S in the drawing in the case of the high-quality reproduction mode and to the terminal N in the drawing in the case of the normal reproduction mode. As a result, the signal recorded in the high-quality recording mode is subjected to the reverse processing of the processing carried out on the recording system side, by the reproduction system-side frequency demodulation circuit 1313, the de-emphasis circuit 1314, and the waveform reverse-conversion circuit 1315. Meanwhile, the signal recorded in the normal recording mode is subjected to reverse processing of the processing carried out on the recording system side, by the reproduction system-side frequency demodulation circuit 1313 and the non-linear de-emphasis circuit 1316. Thus, it is possible to effect high-quality recording and reproduction in the high-quality recording and reproduction mode in addition to the conventional recording and reproduction in the normal recording and reproduction mode.

The non-linear de-emphasis circuit 1316 has opposite characteristics to those of the non-linear emphasis circuit 1302 provided in the aforementioned recording system, and suppresses to its original level the high-frequency component amplified during recording.

As described above, in this embodiment, a description has been given of a case where, at the time of the high-quality recording mode, the noise component is reduced without accompanying an adverse effect on the signal such as the inverted white peak. However, if the non-linear waveform conversion circuit and the emphasis circuit in this embodiment are used instead of the dynamic emphasis circuit conventionally used on the recording side, it is possible to reduce the noise component more than a conventional apparatus. If the linear waveform conversion circuit is used, it is also possible to reduce the noise component because of the reduction of the edge-noise which is most conspicuous in usual pictures. In addition, since the number of circuits to be added is small, the configuration does not become very complicated, and the added circuits and the conventional emphasis circuit can be readily changed over by means of changeover switches. Hence, compatibility with the conventional apparatus can be easily ensured.

Furthermore, since the waveform conversion circuit in this embodiment is arranged such the low-frequency component of the input luminance signal is separated from the high-frequency component, and after the high-frequency component, in particular, is subjected to suppression by a predetermined amount and the two components are added together. Hence, by changing the characteristics of the LPF and the HPF for separating the high-frequency component and the low-frequency component, it is possible to provide a circuit design which allows optimum high-band suppression, so that the degree of freedom in design can be enhanced.

Figure 14A:
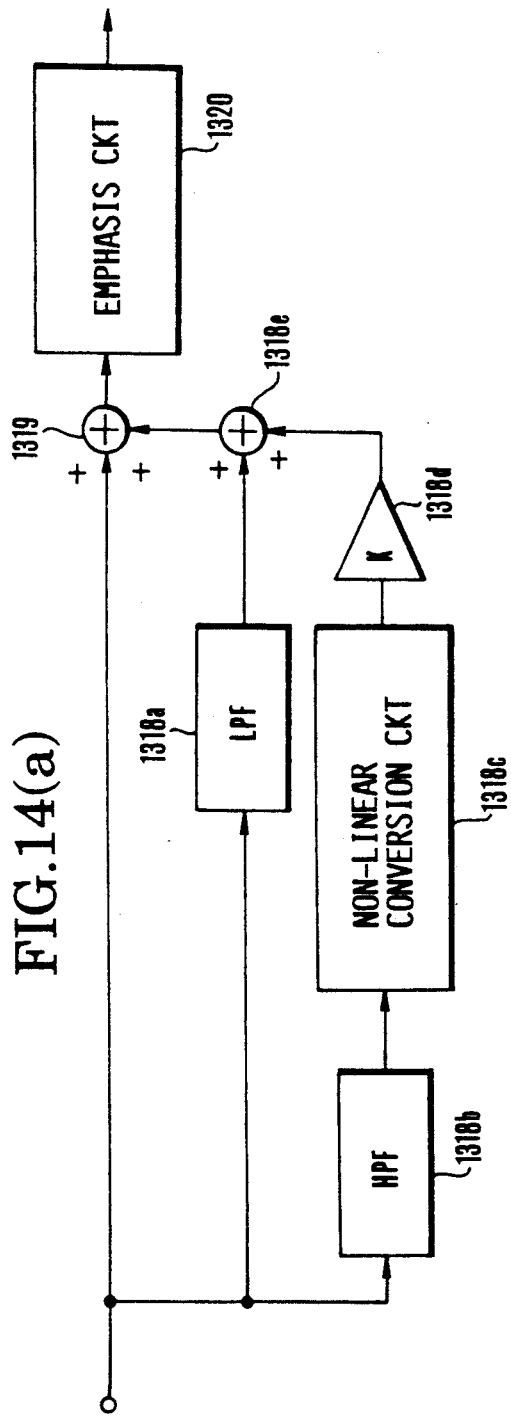
FIGS. 14(a) and 14(b) are schematic diagrams respectively illustrating other examples of the waveform conversion circuit and the waveform reverse-conversion circuit both shown in FIG. 13(a)
Figure 14B:
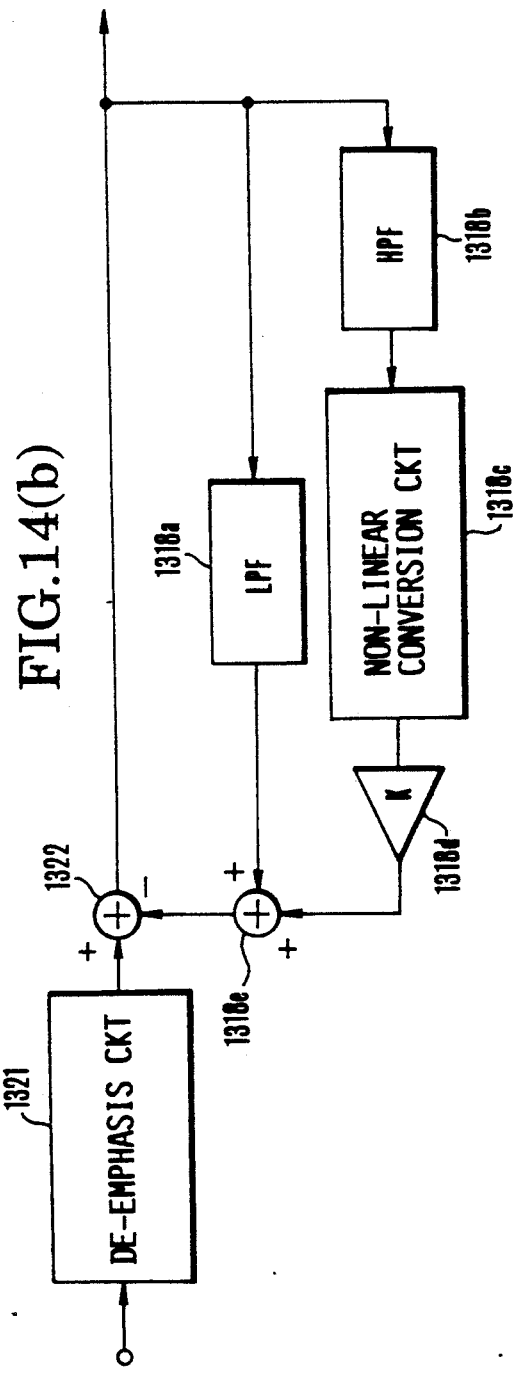

FIGS. 14(a) and 14(b) show other examples of the waveform conversion circuit and the waveform reverse-conversion circuit shown in FIGS. 13(b) and 13(c) as well as the emphasis circuit and the de-emphasis circuit.

When the waveform conversion circuit having a configuration such as the one in FIG. 13(b), in the arrangement of the waveform reverse-conversion circuit shown in FIG. 13(c), it is necessary for the HPF 1315b to be provided with the transfer function $H_{(s)}=1/G_{(s)}$ with respect to the transfer function $G_{(s)}$ of the LPF 1300a, making the design difficult.

Accordingly, the waveform conversion circuit is configured, as shown in FIG. 14(a), and, hence, the configuration of the waveform reverse-conversion circuit becomes such as the one shown in FIG. 14(b). Thus, since it is possible to use some of the components that are identical with those of the waveform conversion circuit (1318a to 1318e in the drawing), the circuit design can be facilitated. At the same time, if common circuits are used for the waveform conversion circuit and the waveform reverse-conversion circuit and are changed over by using a changeover switch or the like between the time of recording and the time of reproduction, the configuration of the apparatus can be simplified.

In FIG. 14(a), 1318a to 1318e have a circuit configuration similar to that of FIG. 13(b), but since the output of the adder 1318e and the input luminance signal are added in an adder 1319, the signal is supplied to an emphasis circuit 1320 in a state in which the level is increased by the portion of the input signal. Therefore, the emphasis circuit 1320 provides emphasis to the output of the adder 1319, and has different characteristics from those of the emphasis circuit 1301 of FIG. 13(a). In addition, a de-emphasis circuit 1321 in FIG. 14(b) has opposite characteristics to those of the emphasis circuit 1320, and the signal whose high-frequency component amplified by the de-emphasis circuit 1321 is suppressed is subjected to negative feedback by an adder 1322, as shown in the drawing, thereby reproducing the reproduction luminance signal.

Figure 15:
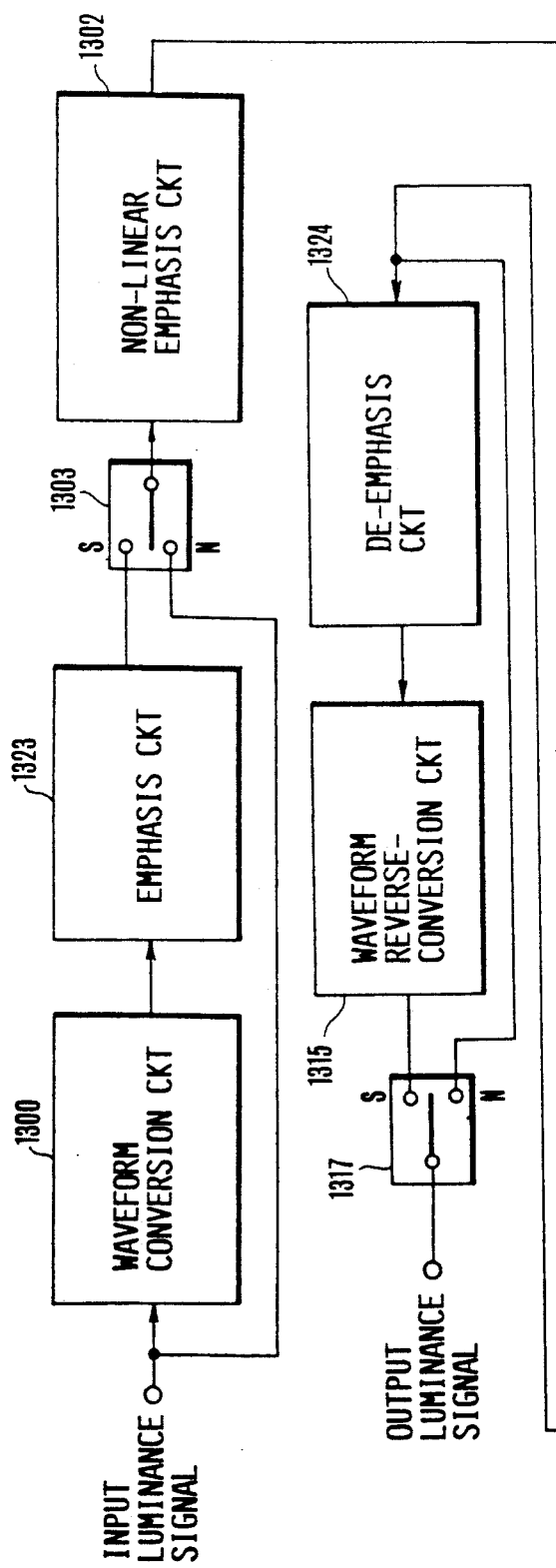
FIG. 15 is a schematic diagram of a still video apparatus in accordance with a fifth embodiment of the present invention.
Figure 15:
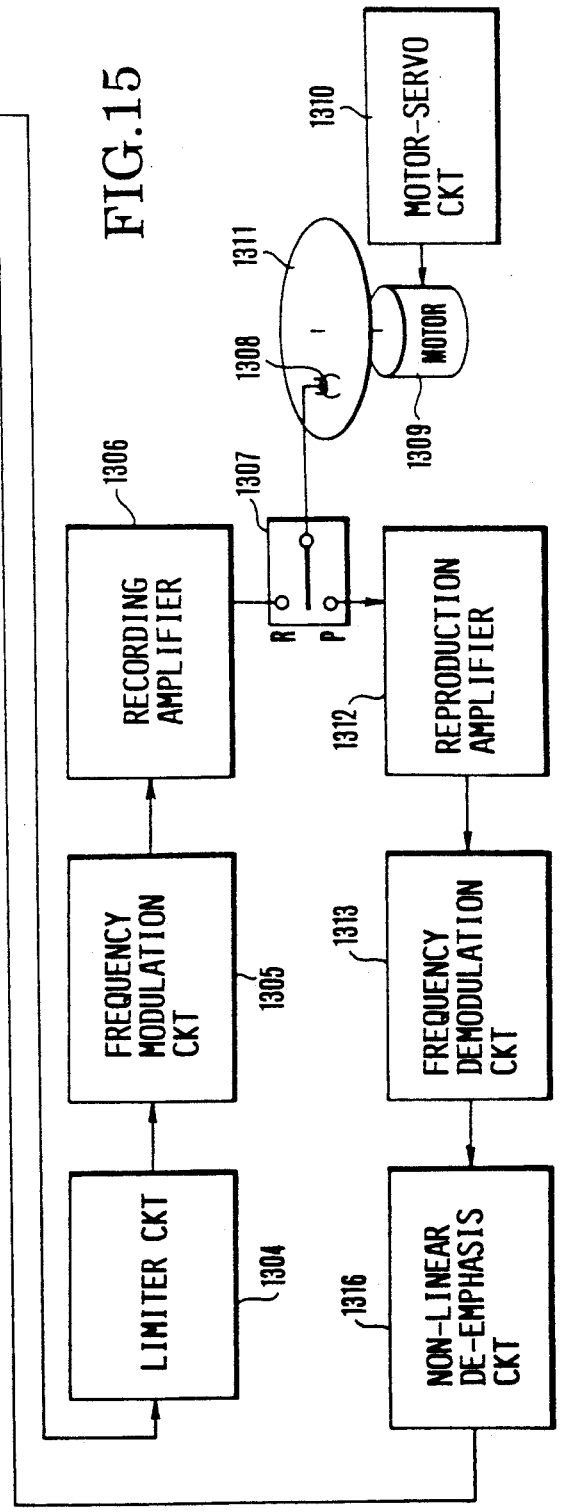

FIG. 15 illustrates a schematic diagram of a still video apparatus in accordance with a fifth embodiment of the present invention. Those components that are similar to those of FIG. 13(a) are denoted by the same reference numerals, and a description thereof will be omitted.

In order to jointly use the non linear emphasis circuit 1302 and the non-linear de-emphasis circuit 1316 at the time of the high-quality recording mode and the normal recording mode, the still video apparatus shown in FIG. 15 is configured such that an emphasis circuit 1323 is provided after the waveform conversion circuit 1300, and a de-emphasis circuit 1324 is provided before the waveform reverse-conversion circuit 1315. This emphasis circuit 1323 may be constituted by either a fixed emphasis circuit or a non-linear emphasis circuit. However, since the non-linear emphasis circuit 1302 is connected in a latter stage via the changeover switch 1303, and, therefore, has different characteristics from those of the emphasis circuit 1301 of FIG. 13(a), the time constant is set in such a manner that the amount of emphasis becomes small. Incidentally, the de-emphasis circuit 1324 has opposite characteristics to those of the emphasis circuit 1323.

Thus, the present invention is applicable not only to the embodiment shown in FIG. 13(a) but also one shown in FIG. 15, and a similar effect can be obtained.

Although, in the foregoing embodiments, a description has been given of cases where the present invention is applied to a still video apparatus, the present invention is not restricted to the same and is applicable to any apparatus, including a video tape recorder, which records and reproduces an information signal by subjecting it to frequency modulation, or an apparatus which effects communication or transmits such a signal, and a similar effect can be obtained. Furthermore, it goes without saying that the information signal handled is not restricted to a luminance signal as in the case of the foregoing embodiments, and a chrominance signal, an audio signal, or any other type of information signal may be employed.

As described above, in accordance with the present invention, it is possible to provide a signal processor invention having a configuration which is capable of maintaining compatibility and reducing the noise component with high accuracy without exerting an adverse effect on the signal during reproduction of the signal and is capable of enhancing the degree of freedom in design.

What is claimed is:

1. A signal processing apparatus for processing an input signal and outputting the processed signal, comprising:

a) signal waveform converting means for converting the input signal in such a manner that a level of signal of a frequency band higher than a first frequency of the input signal is relatively attenuated as compared to a level of signal of a frequency band lower than said first frequency by a predetermined level and for outputting the converted signal; and b) amplifying means for amplifying the converted signal output from said signal waveform converting means in such a manner that a level of a frequency band higher than a second frequency positioned in a frequency band higher than said first frequency is amplified and for outputting the amplified signal.

2. A signal processing apparatus according to claim 1, wherein said amplifying means includes non-linear amplifying means for non-linearly amplifying said converted signal output from said signal waveform converting means in such a manner that the level of the signal of a frequency band higher than the second frequency positioned in a frequency band higher than said first frequency is non-linearly amplified in accordance with the level of the signal of the frequency band higher than said second frequency.

3. A signal processor for processing an input signal and outputting the processed signal, comprising:
   a) high-frequency signal separating means for separating from the input signal a signal of said first high-frequency component;
   b) coefficient multiplying means for multiplying a signal level of said first high-frequency component separated by said high-frequency signal separating means by K-fold (K<1) and for outputting the multiplied signal;
   c) subtracting means for subtracting the signal output by said coefficient multiplying means from said input signal; and
   d) amplifying means for amplifying a second high-frequency component different from said first high-frequency component with respect to said signal outputted from said subtracting means and for outputting the amplified signal.

4. A signal processor for processing an input signal and outputting the processed signal, comprising:
   a) high-frequency signal separating means for separating from the input signal a signal of said first high-frequency component;
   b) coefficient multiplying means for multiplying a signal level of said first high-frequency component separated by said high-frequency signal separating means by K-fold (K<1) and for outputting the multiplied signal;
   c) phase compensating means for compensating a phase shift between the input signal and the signal output by said coefficient multiplying means and for outputting the compensated signal;
   d) subtracting means for subtracting said signal output by said coefficient multiplying means for the input signal whose phase shift is compensated and which is output by said phase compensating means; and
   e) amplifying means for amplifying a second high-frequency component different from said first high-frequency component with respect to said signal outputted from said subtracting means and for outputting the amplified signal.

5. A signal processor for processing an input signal and outputting the processed signal, comprising:
   a) low-frequency signal separating means for separating from the input signal a low-frequency component other than said first high-frequency component;
   b) coefficient multiplying means for multiplying a signal level of said low-frequency component separated by said low-frequency signal separating means by T-fold (T<1) and for outputting the multiplied signal;
   c) adding means for adding to the input the signal output by said coefficient multiplying means; and d) amplifying means for amplifying a second high-frequency component different from said first high-frequency component with respect to said signal outputted form said adding means and for outputting the amplified signal.

6. A signal processor for processing an input signal and outputting the processed signal, comprising:
   a) low-frequency signal separating means for separating from the input signal a low-frequency component other than said first high-frequency component;
   b) coefficient multiplying means for multiplying a signal level of said low-frequency component separated by said low-frequency signal separating means by T-fold (T<1) and for outputting the multiplied signal;
   c) phase compensating means for compensating a phase shift between the input signal and the signal output by said coefficient multiplying means and for outputting the compensated signal;
   d) adding means for adding the signal output by said coefficient multiplying means to said input signal whose phase shift is compensated and which is output by said phase compensating means; and
   e) amplifying means for amplifying a second high frequency component different from said first high-frequency component with respect to said signal outputted from said adding means and for outputting the amplified signal.

7. A signal processor for processing an input signal and outputting the processed signal, comprising:
   a) high-frequency signal separating means for separating a signal of said first high-frequency component from the input signal;
   b) non-linearly attenuating means for continuously attenuating a signal of a predetermined level or below in accordance with a signal level of said first high-frequency component with respect to the signal level of said first high-frequency component separated by said high-frequency signal separating means;
   c) coefficient multiplying means for multiplying by K-fold (K<1) the signal level of said first high-frequency component continuously attenuated by said non-linearly attenuating means with respect to the signal of said predetermined level or below and for outputting the multiplied signal;
   d) subtracting means for subtracting the signal output by said coefficient multiplying means from said input signal; and
   e) amplifying means for amplifying a second high-frequency component different from said first high-frequency component with respect to said signal outputted from said subtracting means and for outputting the amplified signal.

8. A signal processor for processing an input signal and outputting the processed signal, comprising:
   a) coefficient multiplying means for multiplying a signal level of said input signal by K-fold (K<1) and for outputting the multiplied signal;
   b) high-frequency signal separating means for separating a signal of said first high-frequency component from the signal output by said coefficient multiplying means;
   c) non-linearly attenuating means for continuously attenuating a signal of a predetermined level or above in accordance with the signal level of said first high-frequency component with respect to the signal level of said first high-frequency component separated by said high-frequency signal separating means;

d) low-frequency signal separating means for separating from the input signal a signal of a low-frequency component other than said first high-frequency component;

e) adding means for adding the signal of said low-frequency component separated by said low-frequency signal separating means and the signal output by said non-linearly attenuating means and for outputting the added signal; and f) amplifying means for amplifying a second high-frequency component different from said first high-frequency component with respect to said signal outputted from said adding means and for outputting the amplified signal.

9. A signal processor for processing an input signal and for outputting the processed signal, comprising:

a) high-frequency signal separating means for separating a signal of a first high-frequency component from the input signal;

b) non-linearly attenuating means for continuously attenuating a signal of a predetermined level or below in accordance with a signal level of said first high-frequency component with respect to the signal level of said first high-frequency component separated by said high-frequency signal separating means;

c) coefficient multiplying means for multiplying by K-fold (K<1) the signal level of said first high-frequency component continuously attenuated by said non-linearly attenuating means with respect to the signal of said predetermined level or below and for outputting the multiplied signal;

d) low-frequency signal separating means for separating from the input signal a signal of a low-frequency component other than said first high-frequency component;

e) first adding means for adding the signal of said low-frequency component separated by said low-frequency signal separating means to the signal output by said coefficient multiplying means and for outputting the added signal;

f) second adding means for adding the input signal to the signal output by said first adding means and for outputting the added signal; and g) amplifying means for amplifying a second high-frequency component different from said first high-frequency component with respect to said signal outputted from said second adding means and for outputting the amplified signal.

10. An information signal recording apparatus for effecting recording on a recording medium by subjecting an information signal to frequency modulation by using one of a first carrier frequency signal and a second carrier frequency signal having a frequency higher than that of said first carrier frequency signal, said information signal recording apparatus comprising:

a) signal waveform converting means for converting the input information signal in such a manner that a first high-frequency component is relatively attenuated more than a low frequency component by a predetermined amount as compared with a state before the input of said signal and for outputting the converted signal;

b) first amplifying means for amplifying a second high-frequency component different from said first high-frequency component with respect to said signal whose waveform has been converted by said signal waveform converting means and for outputting the amplified signal;

c) changing-over and outputting means for outputting one of the signal output by said first amplifying means and the input information signal;

d) second amplifying means for amplifying a predetermined frequency component of the signal output by said changing-over and outputting means in accordance with the level of said predetermined frequency component and for outputting the amplified signal; and e) recording means to which the signal output by said second amplifying means is input, and in which said input signal is subjected to frequency modulation by using the first carrier frequency signal in a case where said input signal is said input information signal amplified as it is by said second amplifying means, and in which said input signal is subjected to frequency modulation by using the second carrier frequency signal in a case where said input signal is the signal output by said first amplifying means amplified by said second amplifying means, and the frequency-modulated output signal is then recorded on a recording medium.

11. An information signal recording apparatus for effecting recording on a recording medium by subjecting an information signal to frequency modulation by using one of a first carrier frequency signal and a second carrier frequency signal having a frequency higher than that of said first carrier frequency signal, said information signal recording apparatus comprising:

a) first amplifying means for amplifying a predetermined frequency component of the input information signal in accordance with the level of said information signal and for outputting the amplified signal;

b) signal waveform converting means for converting the input signal in such a manner that a first high-frequency component is relatively attenuated more than a low-frequency component by a predetermined amount as compared with a state before the input of said signal and for outputting the converted signal;

c) second amplifying means for amplifying a second high-frequency component different from said first high-frequency component with respect to said signal whose waveform has been converted by said signal waveform converting means and for outputting the amplified signal;

d) changing-over and outputting means for outputting one of the signal output by said first amplifying means and the signal output by said second amplifying means;

e) recording means to which the signal output by said changing-over and outputting means is input, and in which said input signal is subjected to frequency modulation by using the first carrier frequency signal in a case where said input signal is output by said first amplifying means, and in which said input signal is subjected to frequency modulation by using the second carrier frequency signal in a case where said input signal is output by said second amplifying means, and the frequency-modulated signal is then recorded on a recording medium.

12. A signal processor according to claim 3, wherein:

said amplifying means includes non-linearly amplifying means for non-linearly amplifying said second high-frequency component different from said first high-frequency component with respect to said signal outputted from said subtracting means in response to a signal level of said second high-frequency component.

13. A signal processor according to claim 4, wherein said amplifying means includes non-linearly amplifying means for non-linearly amplifying said second high-frequency component different from said first high-frequency component with respect to said signal outputted from said subtracting means in response to a signal level of said second high-frequency component.

14. A signal processor according to claim 5, wherein said amplifying means includes non-linearly amplifying means for non-linearly amplifying said second high-frequency component different from said first high-frequency component with respect to said signal outputted from said adding means in response to a signal level of said second high-frequency component.

15. A signal processor according to claim 5, wherein said amplifying means includes non-linearly amplifying means for non-linearly amplifying said second high-frequency component different from said first high-frequency component with respect to said signal outputted from said adding means in response to a signal level of said second high-frequency component.

16. A signal processor according to claim 7, wherein said amplifying means includes non-linearly amplifying means for non-linearly amplifying said second high-frequency component different from said first high-frequency component different from said first high-frequency component with respect to said signal outputted from said subtracting means in response to a signal level of said second high-frequency component.

17. A signal processor according to claim 8, wherein said amplifying means includes non-linearly amplifying means for non-linearly amplifying said second high-frequency component different from said first high-frequency component with respect to said signal outputted from said adding means in response to a signal level of said second high-frequency component.

18. A signal processor according to claim 9, wherein said amplifying means includes non-linearly amplifying means for non-linearly amplifying said second high-frequency component different from said first high-frequency component with respect to said signal outputted from said second adding means in response to a signal level of said second high-frequency component.

* * * * *